(12) United States Patent
Matsubara et al.

(10) Patent No.: US 7,727,109 B2
(45) Date of Patent: Jun. 1, 2010

(54) VEHICULAR DRIVE CONTROL APPARATUS AND CONTROL METHOD OF VEHICULAR DRIVE SYSTEM

(75) Inventors: Tooru Matsubara, Toyota (JP); Hiroyuki Shibata, Toyota (JP); Atsushi Tabata, Okazaki (JP); Masakazu Kaifuku, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 333 days.

(21) Appl. No.: 12/068,817

(22) Filed: Feb. 12, 2008

(65) Prior Publication Data

US 2008/0194371 A1 Aug. 14, 2008

(30) Foreign Application Priority Data

Feb. 14, 2007 (JP) ............................. 2007-034119

(51) Int. Cl.
*B60K 1/02* (2006.01)
(52) U.S. Cl. ........................................................ 477/3
(58) Field of Classification Search ....................... None
See application file for complete search history.

(56) References Cited

U.S. PATENT DOCUMENTS 7,530,920 B2 * 5/2009 Matsubara et al. ............. 477/3

FOREIGN PATENT DOCUMENTS

JP    A 2005-351459    12/2005

* cited by examiner

*Primary Examiner*—Dirk Wright
(74) *Attorney, Agent, or Firm*—Oliff & Berridge, PLC

(57) ABSTRACT

A rotation speed of a transmitting member is controlled such that a predetermined rotation speed difference or predetermined rotation speed ratio is obtained between the rotation speed of the transmitting member and an eighth rotating element or a fourth rotating element. By detecting a change in the rotation speed of a second motor that is connected to the transmitting member when an apply device is applied, it is possible to determine the time at which a first clutch or a second clutch starts to be applied and the time at which the first clutch or the second clutch is completely applied. As a result, it is possible to control the apply pressure of the first clutch or the second clutch and thus rapidly execute a shift.

17 Claims, 10 Drawing Sheets

| | C1 | C2 | B1 | B2 | B3 | GEAR RATIO | STEP |
|---|---|---|---|---|---|---|---|
| 1st | O | | | | O | 3.357 | 1.54 |
| 2nd | O | | | O | | 2.180 | 1.53 |
| 3rd | O | | O | | | 1.424 | 1.42 |
| 4th | O | O | | | | 1.000 | TOTAL 3.36 |
| R | | O | | | O | 3.209 | |
| N | | | | | | | |

O ENGAGED

VEHICULAR DRIVE CONTROL APPARATUS AND CONTROL METHOD OF VEHICULAR DRIVE SYSTEM

INCORPORATION BY REFERENCE

The disclosure of Japanese Patent Application No. 2007-034119 filed on Feb. 14, 2007, including the specification, drawings and abstract is incorporated herein by reference in its entirety.

BACKGROUND OF THE INVENTION

1. Field of the Invention

The invention relates to a vehicular drive control apparatus provided with i) an electric differential portion that functions as an electric differential device and has a differential mechanism that distributes output from an engine to a first electric motor and a transmitting member, and a second electric motor that is connected to that transmitting member, and ii) a shifting portion that functions as an automatic transmission and constitutes part of a power transmitting path from the transmitting member to driving wheels. The invention also relates to a control method of a vehicular drive system. More particularly, the invention relates to improving torque response when the power transmitting path has been changed from a power transmission-interrupted state to a power transmittable state.

2. Description of the Related Art

Japanese Patent Application Publication No. 2005-351459 (JP-A-2005-351459), for example, describes a related control apparatus for a vehicular drive system that includes an electric differential portion and a shifting portion. The electric differential portion functions as an electric differential device and has a differential mechanism that distributes output from an engine to a first electric motor and a transmitting member, and a second electric motor that is connected to that transmitting member. The shifting portion functions as an automatic transmission and constitutes part of a power transmitting path from the transmitting member to driving wheels.

In JP-A-2005-351459, when the power transmitting path from the electric differential portion to the driving wheels is changed from a non drive state in which power is unable to be transmitted (such as when a shift lever is in the "N" position) to a drive state in which power is able to be transmitted (such as when the shift lever is in the "D" or "CR" position, for example), shift shock can be reduced, even if hydraulic pressure of friction apply elements of the shifting portion that change the power transmitting path to the power transmittable state is applied quickly, by synchronously controlling the rotation speed of the transmitting member to a rotation speed that corresponds to the input shaft of the shifting portion.

When the rotation speed of the transmitting portion is controlled to a completely synchronous speed, as in JP-A-2005-351459, the start and end of application of the friction apply element are unable to be determined from the change in the rotation speed of the transmitting member. Therefore, the apply timing is instead determined according to timer control. In this case, taking into account variation in the period of time that it takes for the apply element to apply, which varies according to the running state, and the like, of the vehicle, the timer period must be set longer, and as a result, the increase in drive torque (i.e., torque response) may be delayed.

SUMMARY OF THE INVENTION

This invention thus provides i) a vehicular drive control apparatus which includes a) an electric differential portion that functions as an electric differential device and has a differential mechanism that distributes output from an engine to a first electric motor and a transmitting member, and a second electric motor that is connected to that transmitting member, and b) a shifting portion that functions as an automatic transmission and constitutes part of a power transmitting path from the transmitting member to driving wheels, as well as ii) a control method of a vehicular drive system, both of which improve torque response when the power transmitting path has been changed from a power transmission-interrupted state to a power transmittable state.

A first aspect of the invention relates to a vehicular drive control apparatus that includes an electric differential portion that functions as an electric differential device and which has i) a differential mechanism that distributes output from an engine to a first electric motor and a transmitting member, and ii) a second electric motor that is connected to the transmitting member; an apparatus having a function of interrupting the transmission of power along a power transmitting path from the transmitting member to a driving wheel; an apply device that selectively transmits drive torque of the transmitting member to the driving wheel; a shift operation executing device which is shifted between a non-drive position or non-drive range that places the power transmitting path in a power transmission-interrupted state and a drive position or drive range that places the power transmitting path in a power transmittable state; and a transmitting member rotation speed controlling portion which, when the shift operation executing device is shifted from the non-drive position or non-drive range into the drive position or drive range, controls the rotation speed of the transmitting member such that a predetermined rotation speed difference or predetermined rotation speed ratio is obtained between the rotation speed of the transmitting member before the apply device is applied and the rotation speed of the transmitting member after the apply device has been applied.

Also, a second aspect of the invention relates to a vehicular drive control apparatus that includes an electric differential portion that functions as an electric differential device and which has i) a differential mechanism that distributes output from an engine to a first electric motor and a transmitting member, and ii) a second electric motor that is connected to the transmitting member; a shifting portion that and constitutes a portion of a power transmitting path from the transmitting member to the driving wheel; an apply device that is provided in the shifting portion and selectively transmits drive torque of the transmitting member to an input rotating member of the shifting portion; a shift operation executing device which is shifted between a non-drive position or non-drive range that places the power transmitting path in a power transmission-interrupted state and a drive position or drive range that places the power transmitting path in a power transmittable state; and a transmitting member rotation speed controlling portion which, when the shift operation executing device is shifted from the non-drive position or non-drive range into the drive position or drive range, controls the rotation speed of the transmitting member such that a predetermined rotation speed difference or predetermined rotation speed ratio is obtained between the rotation speed of the transmitting member and the rotation speed of the input rotating member of the shifting portion.

Further, according to a third aspect of the invention, the control apparatus according to the second aspect also includes an input controlling portion that controls transmitting torque of the apply device in a manner such that the transmitting torque of the apply device gradually increases when the predetermined rotation speed difference or the predetermined rotation speed ratio is obtained between the rotation speed of the transmitting member and the rotation speed of the input rotating member of the shifting portion.

Also, according to a fourth aspect of the invention, in the control apparatus according to the third aspect, the input controlling portion controls output torque of the second electric motor to a constant value while the apply device is executing apply pressure control to apply the transmitting member to the input rotating member.

Further, according to a fifth aspect of the invention, in the control apparatus according to the third or fourth aspect, if the predetermined rotation speed difference or the predetermined rotation speed ratio is not obtained between the rotation speed of the transmitting member and the rotation speed of the input rotating member of the shifting portion, the input controlling portion maximizes the transmitting torque of the apply device and, after the apply device is completely applied, gradually increases output torque of the second electric motor.

Also, according to a sixth aspect of the invention, in the control apparatus according to the fifth aspect, the apply device is determined to be completely applied when a predetermined period of time, which is set in advance, has passed.

Further, according to a seventh aspect of the invention, in the control apparatus according to any one of the first to the fifth aspects, the electric differential portion is made to operate as a continuously variable shifting mechanism by the operating states of the first electric motor and the second electric motor being controlled.

Also, according to an eighth aspect of the invention, in the control apparatus according to any one of the second to the seventh aspects, the shifting portion is a stepped automatic transmission.

Further, a ninth aspect of the invention relates to a control method of a vehicular drive system that includes an electric differential portion that functions as an electric differential device and which has i) a differential mechanism that distributes output from an engine to a first electric motor and a transmitting member, and ii) a second electric motor that is connected to the transmitting member, an apparatus having a function of interrupting the transmission of power along a power transmitting path from the transmitting member to a driving wheel; an apply device that selectively transmits drive torque of the transmitting member to the driving wheel; and a shift operation executing device which is shifted between a non-drive position that places the power transmitting path in a power transmission-interrupted state and a drive position that places the power transmitting path in a power transmittable state. This control method includes controlling, when the shift operation executing device is shifted from the non-drive position into the drive position, the rotation speed of the transmitting member such that a predetermined rotation speed difference or predetermined rotation speed ratio is obtained between the rotation speed of the transmitting member before the apply device is applied and the rotation speed of the transmitting member after the apply device has been applied.

According to the control apparatus of the first aspect of the invention, by controlling the rotation speed of the transmitting member such that a predetermined rotation speed difference or predetermined rotation speed ratio is obtained between the rotation speed of the transmitting member before the apply device is applied and the rotation speed of the transmitting member after the apply device has been applied, the point (i.e., time) at which the apply device starts to be applied and the point (i.e., time) at which the apply device is completely applied can be determined by detecting a change in the rotation speed of the second electric motor that is connected to the transmitting member when the apply device is applied. As a result, apply pressure control (sweep control) of the apply device becomes possible. Accordingly, a shift operation can be executed quickly, which enables torque response to be improved.

According to the control apparatus of the second aspect of the invention, by controlling the rotation speed of the transmitting member such that a predetermined rotation speed difference or predetermined rotation speed ratio is obtained between the rotation speed of the transmitting member and the rotation speed of the input rotating member of the shifting portion, the point (i.e., time) at which the apply device starts to be applied and the point (i.e., time) at which the apply device is completely applied can be determined by detecting a change in the rotation speed of the second electric motor that is connected to the transmitting member when the transmitting member and the input rotating member are engaged by the apply device. As a result, apply pressure control (sweep control) of the apply device becomes possible. Accordingly, a shift operation can be executed quickly, which enables torque response to be improved.

Also, according to the control apparatus of the third aspect of the invention, the transmitting torque of the apply device is controlled so that it gradually increases when the predetermined rotation speed difference or the predetermined rotation speed ratio is obtained between the rotation speed of the transmitting member and the rotation speed of the input rotating member of the shifting portion. This kind of apply pressure control enables drive torque to the driving wheels (i.e., output shaft) to be increased smoothly.

Also, according to the control apparatus of the fourth aspect of the invention, the output torque of the second electric motor is controlled to a constant value while the apply device is executing apply pressure control to apply the transmitting member to the input rotating member. As a result, as the apply pressure of the apply device is controlled so that it gradually increases, the output torque of the second electric motor is transmitted to the driving wheel (i.e., output shaft) in a manner such that it also gradually increases, thus enabling the drive torque to the driving wheel to be increased smoothly.

Further, according to the control apparatus of the fifth aspect of the invention, even if the predetermined rotation speed difference or the predetermined rotation speed ratio is not obtained between the rotation speed of the transmitting member and the rotation speed of the input rotating member of the shifting portion, an increase in the drive torque from the second electric motor is still able to be transmitted to the driving wheel by maximizing the transmitting torque of the apply device and, after the apply device is completely applied, gradually increasing the output torque of the second electric motor.

Also, according to the control apparatus of the sixth aspect of the invention, if the predetermined rotation speed difference or the predetermined rotation speed ratio is not obtained between the rotation speed of the transmitting member and the rotation speed of the input rotating member of the shifting portion, the apply device is determined to be completely applied when a predetermined period of time, which is set in advance, has passed. Therefore, an increase in the drive torque from the second electric motor can be transmitted to the driving wheel by gradually increasing the output torque of the second electric motor after this predetermined period of time has passed.

Further, according to the control apparatus of the seventh aspect of the invention, the electric differential portion and the automatic shifting portion make up a continuously variable transmission so the drive torque can be changed smoothly. Incidentally, the electric differential portion is able to function not only as an electric continuously variable transmission by changing gear ratios continuously (i.e., in a stepless manner), but also as a stepped transmission by changing gear ratios in a stepped manner.

Also, according to the eighth aspect of the invention, for example, the electric differential portion, which can be made to function as an electric continuously variable transmission, and the stepped automatic shifting portion make up a continuously variable transmission so drive torque can be changed smoothly. At the same time, when the gear ratio of the electric differential portion is controlled so that it is constant, a state equivalent to that of a stepped transmission is created by the electric differential portion and the stepped automatic shifting portion such that the overall shift ratio of the vehicular drive system changes in a stepped manner and drive torque can be obtained quickly.

Here, the differential mechanism may be a planetary gear set that has a carrier that is connected to the engine, a sun gear that is connected to the first electric motor, and a ring gear that is connected to the transmitting member. As a result, the dimensions of the differential mechanism in the axial direction can be reduced. Also, the differential mechanism is able to simply be formed by a single planetary gear set.

Further, the planetary gear set may be a single pinion type planetary gear set. As a result, the dimensions of the differential mechanism in the axial direction can be reduced. Also, the differential mechanism is able to simply be formed by a one single pinion type planetary gear set.

Also, the total gear ratio of the vehicular drive system may be produced based on the gear ratio (i.e., speed ratio) of the shifting portion and the gear ratio of the electric differential portion. Accordingly, driving force across a wide range can be obtained using the gear ratios of the shifting portion.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF THE EMBODIMENTS

In the following description and the accompanying drawings, the present invention will be described in more detail in terms of example embodiments.

Figures 1, 2:
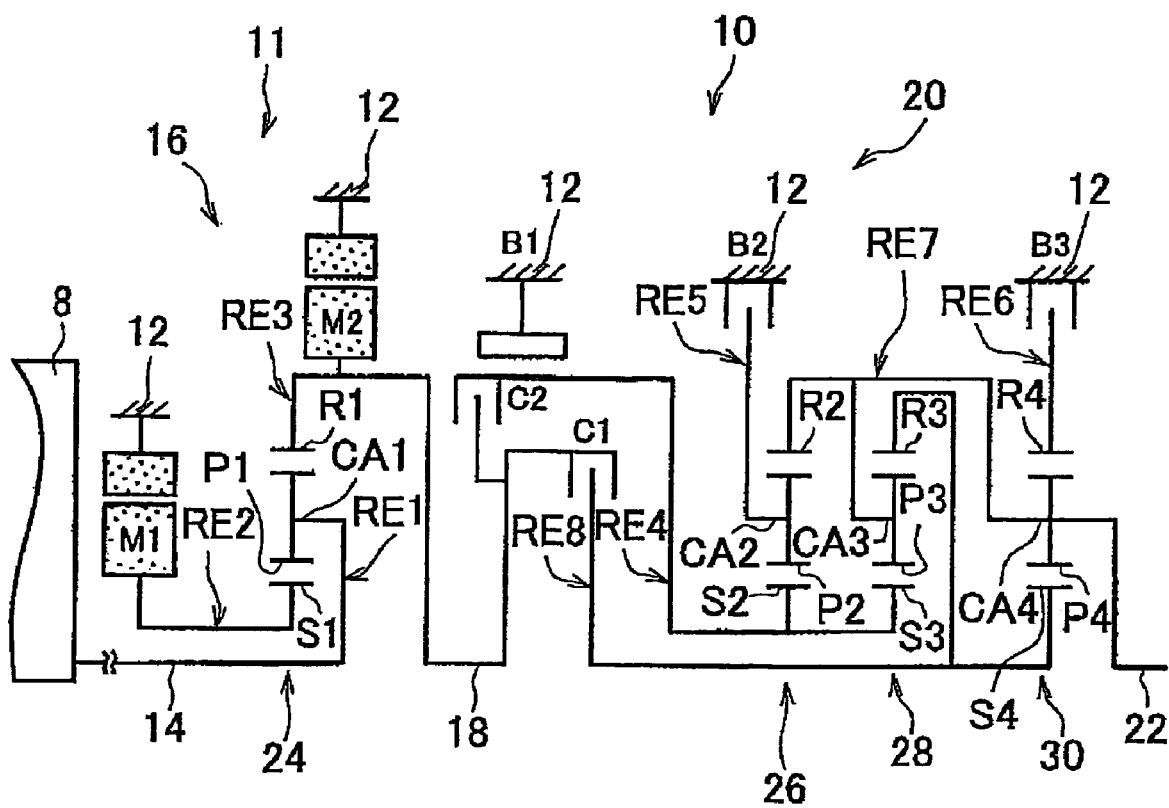
FIG. 1 is a skeleton view of the structure of a drive system of a hybrid vehicle according to one example embodiment of the invention.
FIG. 2 is a clutch and brake application chart showing various application and release combinations of hydraulic friction apply devices used for shift operations in the drive system shown in FIG. 1.

FIG. 1 is a skeleton view of shift mechanism 10 that constitutes part of a drive system of a hybrid vehicle to which the invention can be applied. In FIG. 1, the shift mechanism 10 includes, in series, an input shaft 14, a differential portion 11, an automatic shifting portion 20, and an output shaft 22, all of which are arranged on a common axis inside a transmission case 12 which is a non-rotating member that is attached to the vehicle body (hereinafter this transmission case 12 will simply be referred to as "case 12"). The differential portion 11 is a continuously variable shifting portion that is either directly connected to the input shaft 14 or indirectly connected to the input shaft 14 via a pulsation absorbing damper (i.e., a pulsation damping device), not shown, and the like. The automatic shifting portion 20 is a power transmitting portion that is connected in series via a transmitting member (i.e., a transmitting shaft) 18 in a power transmitting path between the differential portion 11 and driving wheels 34 (see FIG. 7). The output shaft 22 is an output rotating member that is connected to the automatic shifting portion 20. The shift mechanism 10 is preferably used in a FR (front-engine, rear-drive) type vehicle in which it is longitudinally mounted in the vehicle, for example. The shift mechanism 10 is provided between the pair of driving wheels 34 and an engine 8 which is an internal combustion engine such as a gasoline engine or a diesel engine, for example, that serves as a driving power source for running. The engine 8 is either directly connected to the input shaft 14 or connected to the input shaft 14 via a pulsation absorbing damper, not shown. This shift mechanism 10 transmits power from the engine 8 to the pair of driving wheels 34 via a differential gear unit (final reduction device) 32 (see FIG. 7) and a pair of axles, and the like, in that order, which make up part of the power transmitting path.

In this way, in the shift mechanism 10 of this example embodiment, the engine 8 and the differential portion 11 are directly connected. The phrase "directly connected" here means that they are connected without a fluid power transmitting device such as a fluid coupling or a torque converter provided between them, although they may be connected via the pulsation absorbing damper or the like, for example, and still be considered as being directly connected. Incidentally, the shift mechanism 10 has a symmetrical structure with respect to its axis so the lower side is omitted in the skeleton view in FIG. 1. This is also true for each of the following example embodiments.

The differential portion 11 includes a first electric motor M1, a power split device 16, and a second electric motor M2. The power split device 16 is a mechanical differential mechanism which mechanically distributes power that was input to the input shaft 14 from the engine 8 to the first electric motor M1 and the transmitting member 18. The second electric motor M2 is operatively linked to the transmitting member 18 so that they rotate together. The first electric motor M1 and the second electric motor M2 in this example embodiment are both so-called motor-generators that can also function as generators. The first electric motor M1 at least functions as a generator (i.e., is capable of generating power) for generating reaction force, and the second generator M2 at least functions as a motor (i.e., an electric motor) that outputs driving force as a driving power source for running.

The power split device 16 has as its main component a single pinion type first planetary gear set 24 having a predetermined gear ratio $\rho 1$ of approximately 0.418, for example. This first planetary gear set 24 has as rotating elements (i.e., elements) a first sun gear S1, first pinion gears P1, a first carrier CA1 which rotatably and revolvably supports the first pinion gears P1, and a first ring gear R1 that is in mesh with the first sun gear S1 via the first pinion gears P1. When the number of teeth on the first sun gear S1 is ZS1 and the number of teeth on the first ring gear R1 is ZR1, the gear ratio $\rho 1$ is ZS1/ZR1.

In this power split device 16, the first carrier CA1 is connected to the input shaft 14, i.e., the engine 8, the first sun gear S1 is connected to the first electric motor M1, and the first ring gear R1 is connected to the transmitting member 18. In the power split device 16 that is structured in this way, the first sun gear S1, the first carrier CA1, and the first ring gear R1 are each able to rotate relative one another so the power split device 16 is capable of differential operation. Therefore, the output from the engine 8 can be distributed to the first electric motor M1 and the transmitting member 18, with some of the output from the engine 8 that was distributed being used to run the first electric motor M1 to generate electric energy to be stored, and some used run the second electric motor M2 to provide driving force. In this way, the differential portion 11 (i.e., the power split device 16) functions as an electric differential device. For example, the differential portion 11 may be placed in a so-called continuously variable state (i.e., electric CVT state) and the rotation speed of the transmitting member 18 can be continuously (i.e., in a stepless manner) changed regardless of the predetermined speed of the engine 8. That is, the differential portion 11 functions as an electric continuously variable transmission in which its gear ratio $\gamma 0$ (the rotation speed $N_{IN}$ of the input shaft 14 divided by the rotation speed $N_{18}$ of the transmitting member 18) can be continuously (i.e., in a stepless manner) changed from a minimum value $\gamma 0min$ to a maximum value $\gamma 0max$.

The automatic shifting portion 20 corresponds to the shifting portion of the invention and is a planetary gear type multi-speed transmission that functions as a stepped automatic transmission and includes a single pinion type second planetary gear set 26, a single pinion type third planetary gear set 28, and a single pinion type fourth planetary gear set 30. The second planetary gear set 26 includes a second sun gear S2, second pinion gears P2, a second carrier CA2 which rotatably and revolvably supports the second pinion gears P2, and a second ring gear R2 that is in mesh with the second sun gear S2 via the second pinion gears P2, and has a gear ratio $\rho 2$ of approximately 0.562, for example. The third planetary gear set 28 includes a third sun gear S3, third pinion gears P3, a third carrier CA3 which rotatably and revolvably supports the third pinion gears P3, and a third ring gear R3 that is in mesh with the third sun gear S3 via the third pinion gears P3, and has a gear ratio $\rho 3$ of approximately 0.425, for example. The fourth planetary gear set 30 includes a fourth sun gear S4, fourth pinion gears P4, a fourth carrier CA4 which rotatably and revolvably supports the fourth pinion gears P4, and a fourth ring gear R4 that is in mesh with the fourth sun gear S4 via the fourth pinion gears P4, and has a gear ratio $\rho 4$ of approximately 0.421, for example. When the number of teeth of the second sun gear S2 is ZS2, the number of the teeth on the second ring gear R2 is ZR2, the number of teeth on the third sun gear S3 is ZS3, the number of teeth on the third ring gear R3 is ZR3, the number of teeth on the fourth sun gear S4 is ZS4, and the number of teeth on the fourth ring gear R4 is ZR4, the gear ratio $\rho 2$ is ZS2/ZR2, the gear ratio $\rho 3$ is ZS3/ZR3, and the gear ratio $\rho 4$ is ZS4/ZR4.

In the automatic shifting portion 20, the second sun gear S2 and the third sun gear S3 are integrally connected together as well as selectively connected to the transmitting member 18 via the second clutch C2 and selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4 are integrally connected together as well as to the output shaft 22. The third ring gear R3 and the fourth sun gear S4 are integrally connected together as well as selectively connected to the transmitting member 18 via the first clutch C1.

In this way, the differential portion 11 (i.e., the transmitting member 18) is selectively connected to the inside of the automatic shifting portion 20 via the first clutch C1 or the second clutch C2 which are used to establish various gears in the automatic shifting portion 20. In other words, the first clutch C1 and the second clutch C2 function as apply devices that selectively change the power transmitting path between the transmitting member 18 and the automatic shifting portion 20, i.e., from the differential portion 11 (i.e., the transmitting member 18) to the driving wheels 34, between a power transmittable state in which power is able to be transmitted along that power transmitting path and a power transmission-interrupted state in which power is not able to be transmitted (i.e., the flow of power is interrupted) along that power transmitting path. That is, applying at least one of the first clutch C1 and the second clutch C2 places the power transmitting path in the power transmittable state. Conversely, releasing both the first clutch C1 and the second clutch C2 places the power transmitting path in the power transmission-interrupted state.

Also, this automatic shifting portion 20 selectively establishes a given gear (i.e., speed) by performing a clutch-to-clutch shift by releasing one apply device (i.e., an apply device to be released, hereinafter also referred to as a "release-side apply device") and applying another (i.e., an apply device to be applied, hereinafter also referred to as an "apply-side apply device"). Accordingly, a gear ratio $\gamma$ (=the rotation speed $N_{18}$ of the transmitting member 18 divided by the rotation speed $N_{OUT}$ of the output shaft 22) that changes in substantially equal ratio is able to be obtained for each gear. For example, as shown in the clutch and brake application chart in FIG. 2, first gear which has the largest gear ratio $\gamma 1$, e.g., approximately 3.357, can be established by applying the first clutch C1 and the third brake B3. Second gear which has a gear ratio $\gamma 2$ smaller than that of first gear, e.g., approximately 2.180, can be established by applying the first clutch C1 and the second brake B2. Third-gear which has a gear ratio $\gamma 3$ smaller than that of second gear, e.g., approximately 1.424, can be established by applying the first clutch C1 and the first brake B1. Fourth gear which has a gear ratio $\gamma 4$ smaller than that of third gear, e.g., approximately 1.000, can be established by applying the first clutch C1 and the second clutch C2. Reverse (i.e., a reverse gear) which has a gear ratio γR between that of first gear and that of second gear, e.g., approximately 3.209, can be established by applying the second clutch C2 and the third brake B3. Also, the automatic shifting portion 20 can be placed in neutral "N" by releasing all of the clutches and brakes, i.e., the first clutch C1, the second clutch C2, the first brake B1, the second brake B2, and the third brake B3.

The first clutch C1, the second clutch C2, the first brake B1, the second brake B2, and the third brake B3 (hereinafter these will simply be referred to as "clutches C" and "brakes B" when not particularly specified) are hydraulic friction apply devices which function as apply elements that are often used in conventional vehicular automatic transmissions. These clutches C may be wet type multiple disc clutches in which a plurality of stacked friction plates are pressed together by a hydraulic actuator, and the brakes B may be a band brakes in which the one end of one or two bands that are wound around the outer peripheral surface of a rotating drum is pulled tight by a hydraulic actuator. The hydraulic friction apply devices selectively connect members on either side of them.

In the shift mechanism 10 having a structure such as that described above, the automatic shifting portion 20 and the differential portion 11 that functions as a continuously variable transmission on the whole make up a continuously variable transmission. Also, by controlling the gear ratio of the differential portion 11 so that it is constant, the shift mechanism 10 can be placed in the same state as a stepped transmission by the differential portion 11 and the automatic shifting portion 20.

More specifically, by using the differential portion 11 as a continuously variable transmission and using the automatic shifting portion 20, which is in series with the differential portion 11, as a stepped transmission, the rotation speed input to the automatic shifting portion 20 (i.e., the input rotation speed of the automatic shifting portion 20), i.e., the rotation speed of the transmitting member 18 (hereinafter referred to as the "transmitting member rotation speed $N_{18}$") is continuously (i.e., in a stepless manner) changed with respect to at least one gear M of the automatic shifting portion 20 such that a continuous gear ratio range can be obtained for that gear M. Therefore, the total gear ratio γT (=rotation speed $N_{IN}$ of the input shaft 14/rotation speed $N_{OUT}$ of the output shaft 22) can be obtained in a continuous, stepless manner, such that a continuously variable transmission is formed in the shift mechanism 10. The total gear ratio γT is the total gear ratio γT for the overall shift mechanism 10 that is produced based on the gear ratio γ0 of the differential portion 11 and the gear ratio γ of the automatic shifting portion 20.

For example, a continuous gear ratio range can be obtained for each gear by continuously (i.e., in a stepless manner) changing the transmitting member rotation speed $N_{18}$ for each gear, i.e., 1st gear to 4th gear and reverse, of the automatic shifting portion 20 shown in the clutch and brake application chart in FIG. 2. As a result, there are continuously variable gear ratios between the gears such that the total gear ratio γT for the overall shift mechanism 10 can be continuous (i.e., stepless).

Also, the total gear ratio γT of the shift mechanism 10 that changes in substantially equal ratio for each gear can be obtained by selectively establishing any one of the four forward gears (1st gear to 4th gear) or reverse (i.e., reverse gear) by controlling the gear ratio of the differential portion 11 to be constant and selectively applying the clutches C and brakes B. Therefore, the shift mechanism 10 can be placed in the same state as a stepped transmission.

For example, when the gear ratio γ0 of the differential portion 11 is controlled so that it is fixed at 1, the total gear ratio γT of the shift mechanism 10 corresponding to each gear (i.e., 1st gear to 4th gear and reverse) in the automatic shifting portion 20 can be obtained for each gear as shown in the clutch and brake application chart in FIG. 2. Also, when the gear ratio γ0 of the differential portion 11 is controlled so that it is fixed at a value that is less than 1, such as approximately 0.7, for example, in fourth gear of the automatic shifting portion 20, the total gear ratio γT of a value less than that of fourth gear, such as approximately 0.7, for example, can be obtained.

Figure 3:
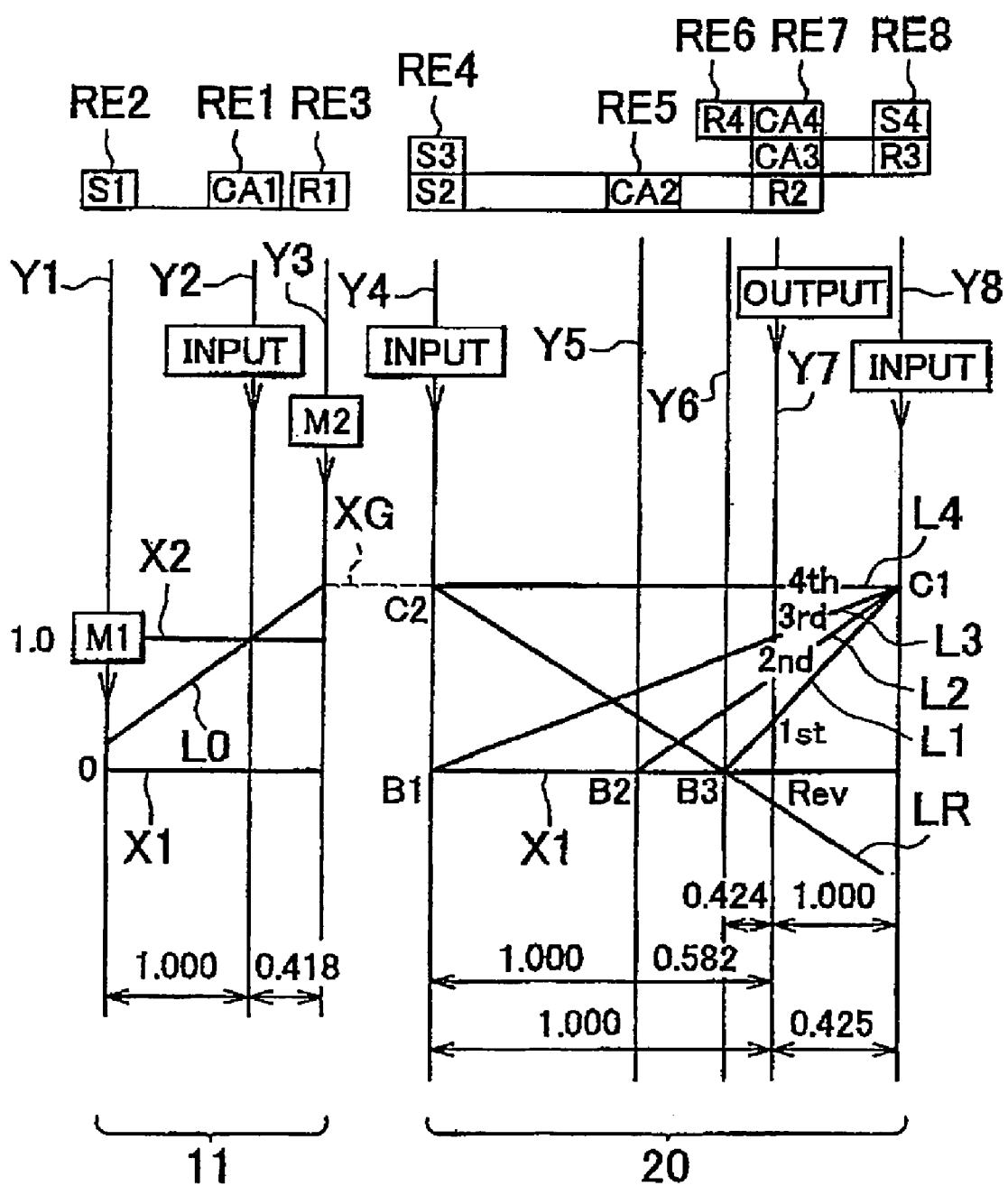
FIG. 3 is an alignment graph illustrating the relative rotation speeds in each gear of the drive system shown in FIG. 1.

FIG. 3 is an alignment graph which shows the relationship, on straight lines, among the rotation speeds of the various rotating elements that are in different connective states in each gear in the shift mechanism 10 that is made up of the differential portion 11 and the automatic shifting portion 20. This alignment graph in FIG. 3 is a two-dimension coordinate system having a horizontal axis that represents the relationship among the gear ratios ρ of the planetary gear sets 24, 26, 28, and 30, and a vertical axis that represents the relative rotation speeds. The horizontal line X1 represents a rotation speed of zero, the horizontal line X2 represents a rotation speed of 1.0, i.e., the rotation speed $N_E$ of the engine 8 that is connected to the input shaft 14, and the horizontal line XG represents the rotation speed of the transmitting member 18.

Also, the three vertical lines Y1, Y2, and Y3 corresponding to the three elements of the power split device 16 that forms the differential portion 11 represent, in order from left to right, the relative rotation speeds of the first sun gear S1 corresponding to a second rotating element (second element) RE2, the first carrier CA1 corresponding to a first rotating element (first element) RE1, and the first ring gear R1 corresponding to a third rotating element (third element) RE3. The intervals between the vertical lines Y1, Y2, and Y3 are determined by the gear ratio ρ1 of the first planetary gear set 24. Further, the five vertical lines Y4, Y5, Y6, Y7, and Y8 of the automatic shifting portion 20 represent, in order from left to right, the second sun gear S2 and the third sun gear S3 which are connected together and correspond to a fourth rotating element (fourth element) RE4, the second carrier CA2 corresponding to a fifth rotating element (fifth element) RE5, the fourth ring gear R4 corresponding to a sixth rotating element (sixth element) RE6, the second ring gear R2, the third carrier CA3, and the fourth carrier CA4 which are connected together and correspond to a seventh rotating element (seventh element) RE7, and the third ring gear R3 and the fourth sun gear S4 which are connected together and correspond to an eighth rotating element (eighth element) RE8. The intervals between them are determined according to the gear ratio. ρ2 of the second planetary gear set 26, the gear ratio ρ3 of the third planetary gear set 28, and the ρ4 of the fourth planetary gear set 30. In the relationships among the spaces between the vertical axes in the alignment graph, when the space between the sun gear and the carrier is an interval corresponding to 1, the space between the carrier and the ring gear is an interval corresponding to the gear ratio ρ of the planetary gear set. That is, in the differential portion 11, the space between the vertical lines Y1 and Y2 is set to an interval corresponding to 1, and the space between vertical lines Y2 and Y3 is set to an interval corresponding to the gear ratio ρ1. Also, in the automatic shifting portion 20, the space between the sun gear and the carrier in each of the second, third, and fourth planetary gear sets 26, 28, and 30 is set to an interval corresponding to 1, and the space between the carrier and the ring gear is set to an interval corresponding to ρ.

When expressed using the alignment graph in FIG. 3, the shift mechanism 10 in this example embodiment is structured such that in the power split device 16 (i.e., the differential portion 11), the first rotating element RE1 (i.e., the first carrier CA1) of the first planetary gear set 24 is connected to the input shaft 14, i.e., the engine 8, and the third rotating element (i.e., the first ring gear R1) RE3 is connected to the transmitting member 18 and the second electric motor M2 such that the rotation of the input shaft 14 is transmitted (input) to the automatic shifting portion 20 via the transmitting member 18. At this time, the relationship between the rotation speed of the first sun gear S1 and the rotation speed of the first ring gear R1 is shown by the sloped straight line L0 passing through the point of intersection of Y2 and X2.

For example, if the rotation speed of the first carrier CA1 represented by the point of intersection of the straight line L) and the vertical line Y2 is increased or decreased by controlling the engine speed $N_E$ when the differential portion 11 is in a differential state in which the first rotating element RE1, the second rotating element RE2, and the third rotating element RE3 are able to rotate relative one another and the rotation speed of the first ring gear R1 represented by the point of intersection of the straight line L0 and the vertical line Y3 is restricted by the vehicle speed V and substantially constant, the rotation speed of the first sun gear S1 represented by the point of intersection of the straight line L0 and the vertical line Y1, i.e., the rotation speed of the first electric motor M1, will increase or decrease.

Also, if the rotation speed of the first sun gear S1 is made the same as the engine speed $N_E$ by controlling the rotation speed of the first electric motor M1 so that the gear ratio γ0 of the differential portion 11 is fixed at 1, the straight line L0 will match the horizontal line X2, and the first ring gear R1, i.e., the transmitting member 18, will rotate at the same speed as the engine speed $N_E$. Alternatively, if the rotation speed of the first sun gear S1 is made zero by controlling the rotation speed of the first motor M1 so that the gear ratio γ0 of the differential portion 11 is fixed at a value less than 1, such as approximately 0.7, for example, the transmitting member rotation speed $N_{18}$ will be faster than the engine speed $N_E$.

Also, in the automatic shifting portion 20, the fourth rotating element RE4 is selectively connected to the transmitting member 18 via the second clutch C2, as well as selectively connected to the case 12 via the first brake B1. The fifth rotating element RE5 is selectively connected to the case 12 via the second brake B2. The sixth rotating element RE6 is selectively connected to the case 12 via the third brake B3. The seventh rotating element RE7 is connected to the output shaft 22, and the eighth rotating element RE8 is selectively connected to the transmitting member 18 via the first clutch C1. Incidentally, the eighth rotating element RE8 functions as an input rotating member of the automatic shifting portion 20 and driving force from the transmitting member 18 can be selectively transmitted to the eighth rotating element RE8 via the first clutch C1. Also, similarly, the fourth rotating element RE4 also functions as an input rotating member of the automatic shifting portion 20 and driving force from the transmitting member 18 can be selectively transmitted to the fourth rotating element RE4 via the second clutch C2.

As shown in FIG. 3, in the automatic shifting portion 20, when rotation is input to the eighth rotating element RE8 from the transmitting member 18 (i.e., the third rotating element RE3) which is the output rotating member of the differential portion 11, the rotation speed of the output shaft 22 in first gear (1st), which is established by applying the first clutch C1 and the third brake B3, is shown at the point of intersection of i) the sloped straight line L1 that passes through both the point of intersection of the horizontal line XG and the vertical line Y8 that represents the rotation speed of the eighth rotating element RE8, and the point of intersection of the horizontal line X1 and the vertical line Y6 that represents the rotation speed of the sixth rotating element RE6, and ii) the vertical line Y7 that represents the rotation speed of the seventh rotating element RE7 that is connected to the output shaft 22. Similarly, the rotation speed of the output shaft 22 in second gear (2nd), which is established by applying the first clutch C1 and the second brake B2, is shown at the point of intersection of the sloped straight line L2 and the vertical line Y7 that represents the rotation speed of the seventh rotating element RE7 that is connected to the output shaft 22. Also, the rotation speed of the output shaft 22 in third gear (3rd), which is established by applying the first clutch C1 and the first brake B1, is shown at the point of intersection of the sloped straight line l3 and the vertical line Y7 that represents the rotation speed of the seventh rotating element RE7 that is connected to the output shaft 22. Similarly, the rotation speed of the output shaft 22 in fourth gear (4th), which is established by applying the first clutch C1 and the second clutch C2, is shown at the point of intersection of the horizontal straight line L4 and the vertical line Y7 that represents the rotation speed of the seventh rotating element RE7 that is connected to the output shaft 22.

Figure 4:
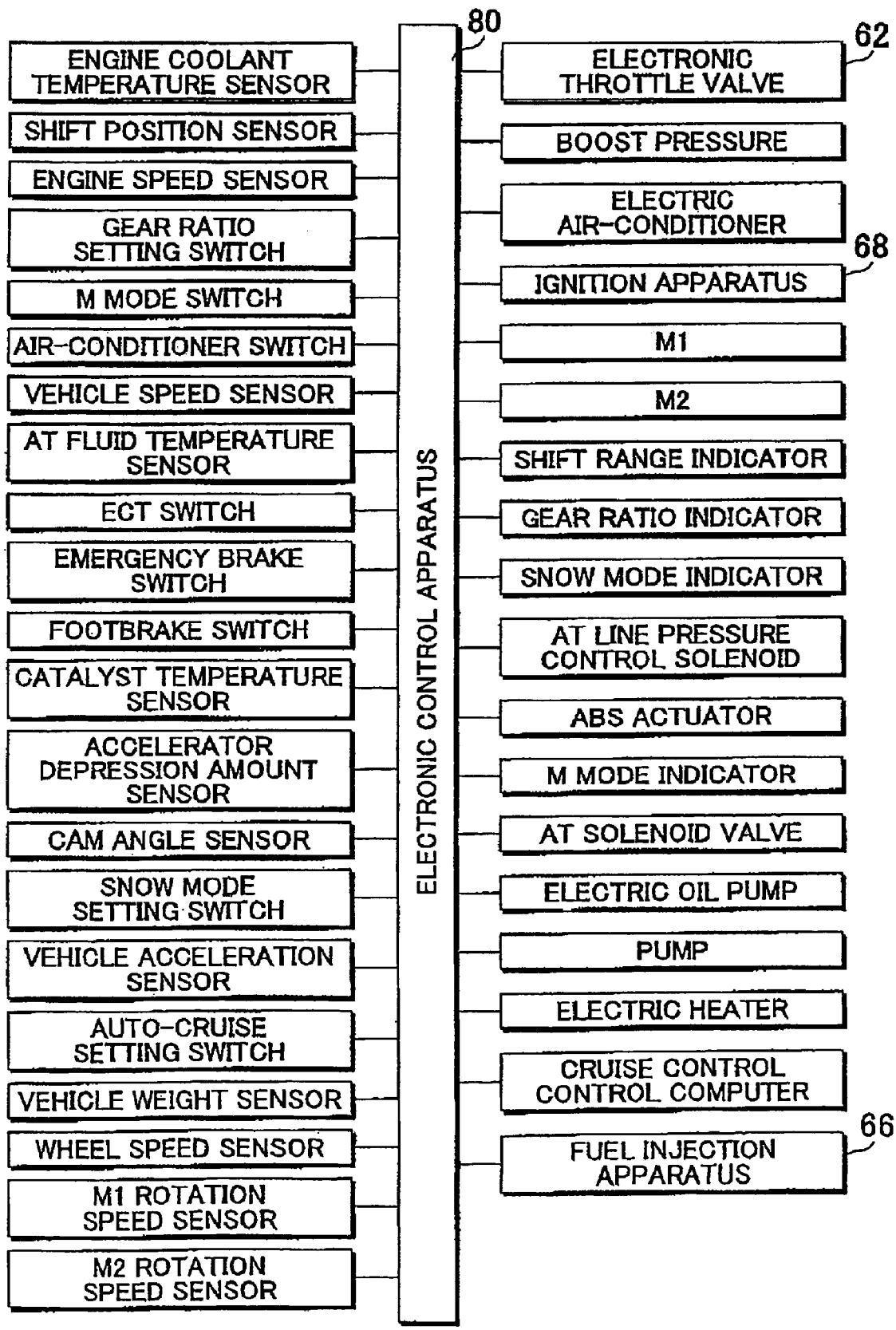
FIG. 4 is a view showing input and output signals of an electronic control apparatus provided in the drive system shown in FIG. 1.

FIG. 4 shows an example of signals input to (i.e., received by) and output from an electronic control apparatus for controlling the shift mechanism 10 in this example embodiment. This electronic control apparatus includes a so-called microcomputer that includes a CPU, ROM, RAM, and input/output interfaces and the like. The electronic control apparatus 80 executes drive control, such as shift control of the automatic shifting portion 20 and hybrid control related to the engine and the first and second electric motors M1 and M2, by processing the signals according to programs stored in advance in the ROM while using the temporary storage function of the RAM.

Various signals are input to this electronic control apparatus 80 from various sensors and switches and the like, as shown in FIG. 4. Among these signals are a signal indicative of the engine coolant temperature TEMP$_W$, a signal indicative of a shift position P$_{SH}$ of a shift lever 52 (see FIG. 6), a signal indicative of the engine speed $N_E$ which is the speed of the engine 8; a signal indicative of a gear ratio setting value, a signal indicative of a command to operate in a M mode (manual shift running mode), a signal indicative of operation of an air conditioner, a signal indicative of the vehicle speed V corresponding to the rotation speed $N_{OUT}$ of the output shaft 22 (hereinafter this rotation speed will be referred to as the "output shaft rotation speed $N_{OUT}$") a signal indicative of the hydraulic fluid temperature T$_{OIL}$ of the automatic shifting portion 20, a signal indicative of an emergency brake operation, a signal indicative of a footbrake operation. a signal indicative of the catalyst temperature, and a signal indicative of the accelerator depression amount A$_{CC}$ which is the amount that an accelerator pedal is being depressed which corresponds to the amount of output required by the driver. Other signals received by the electronic control apparatus 80 include a signal indicative of the cam angle, a signal indicative of a snow mode setting, a signal indicative of the longitudinal acceleration G of the vehicle, a signal indicative of auto-cruise running, a signal indicative of the vehicle mass (i.e., vehicle weight), signals indicative of the wheel speed of each wheel, a signal indicative of the rotation speed $N_{M1}$ of the first electric motor M1 (hereinafter simply referred to as "first electric motor rotation speed $N_{M1}$"), a signal indicative of the rotation speed $N_{M2}$ of the second electric motor M2

(hereinafter simply referred to as "second electric motor rotation speed $N_{M2}$"), and a signal indicative of the SOC (state-of-charge) of a power storage device 56 (see FIG. 7), and the like.

The electronic control apparatus 80 also outputs various signals. Some of these signals include control signals that are output to an engine output controlling portion 58 (see FIG. 7) that controls engine output, such as a drive signal to a throttle actuator 64 that operates the throttle valve opening amount $\theta_{TH}$ of an electronic throttle valve 62 provided in an intake passage 60 of the engine 8, a fuel supply quantity signal that controls the amount of fuel supplied to the intake passage 60 or the cylinders of the engine 8 by a fuel injection apparatus 66, an ignition signal that dictates the ignition timing of the engine 8 by an ignition apparatus 68, and a pressure boost adjusting signal for adjusting the boost pressure. Other signals output from the electronic control apparatus 80 include an electric air-conditioner drive signal for operating an electric air-conditioner, command signals indicative of commands to operate the electric motors M1 and M2, a shift position (operating position) indication signal for operating a shift indicator, a gear ratio indication signal for indicating the gear ratio, a snow mode indication signal for indicating when the vehicle is being operated in snow mode, an ABS activation signal to activate an ABS actuator that prevents the wheels from slipping during braking, an M mode indication signal that indicates that the M mode has been selected, valve command signals that operate electromagnetic valves (i.e., linear solenoid valves) included in a hydraulic pressure control circuit 70 (see FIGS. 5 and 7) for controlling hydraulic actuators of the hydraulic friction apply devices of the differential portion 11 and the automatic shifting portion 20, a signal for adjusting the line pressure $P_L$ using a regulator valve (i.e., a pressure regulating valve) provided in the hydraulic pressure control circuit 70, a drive command signal for operating an electric hydraulic pump which is the source for the base pressure of the line pressure $P_L$ to be adjusted, a signal for driving an electric heater, and a signal to be output to a computer for controlling cruise control.

Figure 5:
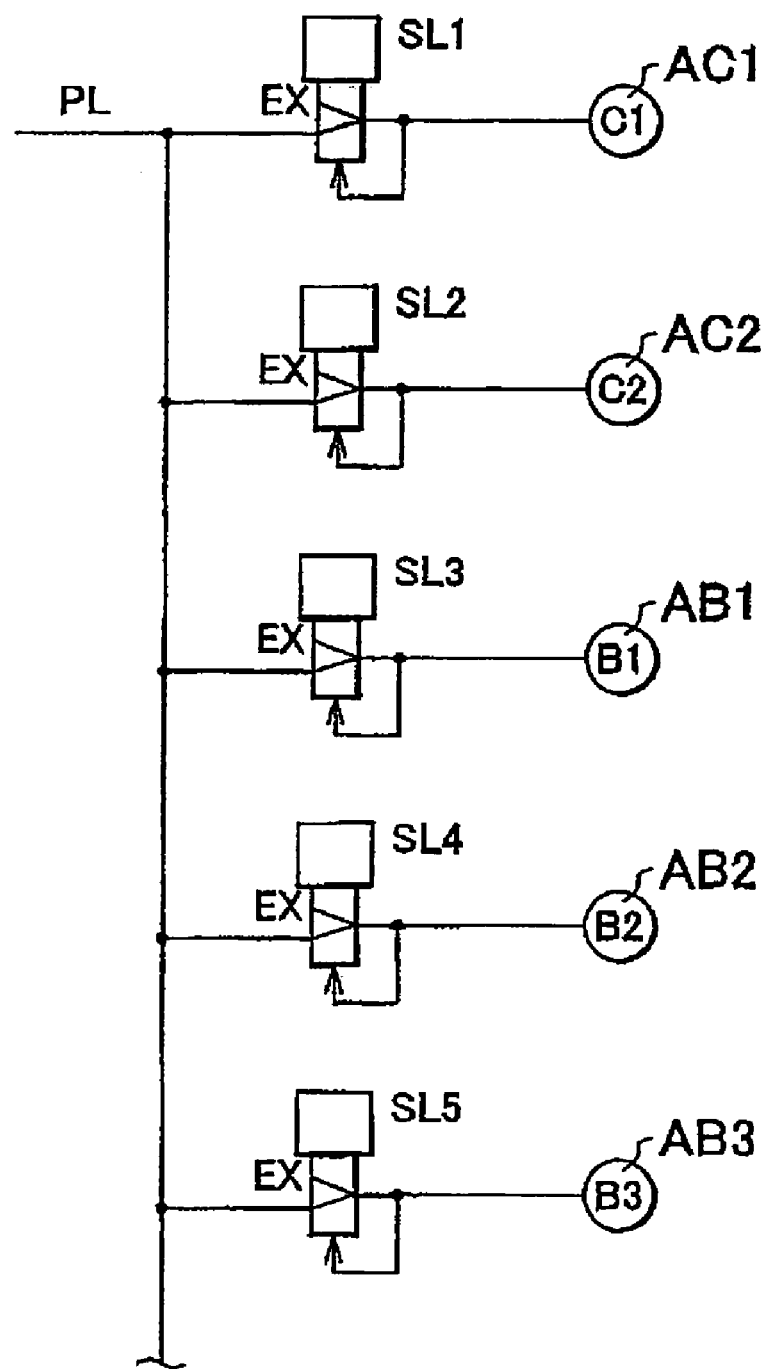
FIG. 5 is a circuit diagram related to linear solenoid valves that control the operation of various hydraulic actuators of clutches and brakes in a hydraulic pressure control circuit.

FIG. 5 is a circuit diagram related to linear solenoid valves SL1 to SL5 in the hydraulic pressure control circuit 70 which control the operation of hydraulic actuators (i.e., hydraulic cylinders) AC1, AC2, AB1, AB2, and AB3 of the clutches C and brakes B in the hydraulic pressure control circuit 70.

In FIG. 5, linear solenoid valves SL1 to SL5 adjust the line pressure PL to apply pressures PC1, PC2, PB1, PB2, and PB3 according to command signals from the electronic control apparatus 80, and those adjusted apply pressures PC1, PC2, PB1, PB2, and PB3 are supplied directly to the hydraulic actuators AC1, AC2, AB1, AB2, and AB3, respectively. The line pressure PL is adjusted to a value according to the engine load and the like indicated by the accelerator depression amount or the throttle opening amount by a relief type regulating valve (i.e., regulator valve) with the pressure that is generated by a mechanical oil pump, which is driven by the engine 8, or an electric oil pump, not shown, as the base pressure.

The linear solenoid valves SL1 to SL5 all basically have the same structure and are individually energized or de-energized by the electronic control apparatus 80 such that the hydraulic pressures of the hydraulic actuators AC1, AC2, AB1, AB2, AB3 are individually controlled and adjusted to control the apply pressures PC1, PC2, PB1, PB2, and PB3 of the clutches C1 and C2 and the brakes B1, B2, and B3. Then the automatic shifting portion 20 establishes a given gear by applying predetermined apply devices as shown by the clutch and brake application chart in FIG. 2, for example. Also, in shift control of the automatic shifting portion 20, a so-called clutch-to-clutch shift is executed, for example. A clutch-to-clutch shift is a shift in which one clutch C or brake B that is involved in the shift is released at the same time another clutch C or brake B that is also involved in the shift is applied.

Figure 6:
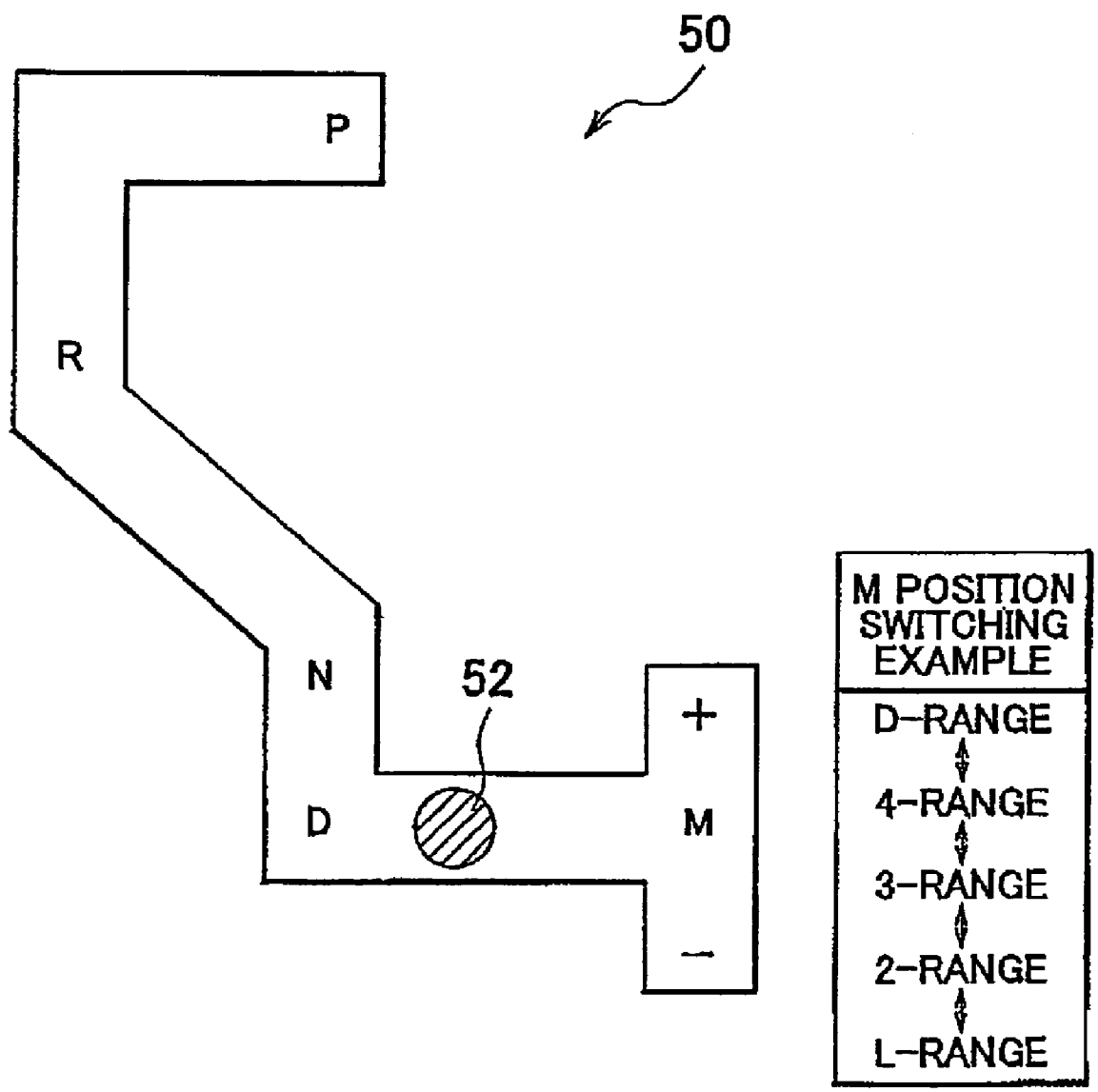
FIG. 6 is an example of a shift operation executing device provided with a shift lever that is operated to select any of a plurality of various shift positions.

FIG. 6 shows one example of a shift operation executing device 50 that serves as switching device that is operated by a person in order to switch among a plurality of various shift positions $P_{SH}$. This shift operation executing device 50 is provided with a shift lever 52 that is arranged at the side of the driver's seat, for example, and is operated to select any one of the plurality of various shift positions $P_{SH}$.

This shift lever 52 is provided so as to be manually operated (i.e., shifted) into various positions. These positions include a park position "P", a reverse "R" position, a neutral position "N", a forward drive position "D", and a forward manual shift position "M". Shifting the shift lever 52 into the park position "P" places the transmitting mechanism 10, i.e., the automatic shifting portion 20, in a neutral state in which the power transmitting path therein is interrupted, and locks the output shaft 22 of the automatic shifting portion 20. Shifting the shift lever 52 into the reverse position "R" enables the vehicle to run in reverse. Shifting the shift lever 52 into the neutral position "N" places the transmitting mechanism 10 in a neutral state in which the power transmitting path therein is interrupted. Shifting the shift lever 52 into the forward drive position "D" establishes an automatic shift mode in which automatic shift control is executed within the range of the total shift ratio γT into which the transmitting mechanism 10 can be shifted that can be obtained by i) a continuous gear ratio range of the differential portion 11 and ii) the gears to which automatic shift control applies within the range of 1st gear to 4th gear in the automatic shifting portion 20. Shifting the shift lever 52 into the forward manual position "M" establishes a manual shift mode (i.e., a manual operation mode) and sets a so-called shift range that limits the highest gear (i.e., the highest gear into which the automatic shifting portion 20 can shift) in the automatic shifting portion 20.

The hydraulic control circuit 70, for example, can electrically switch in connection with a manual operation of the shift lever 52 into a shift position $P_{SH}$ so as to establish reverse "R", neutral "N", or any forward gear in drive "D", which are shown in the clutch and brake application chart in FIG. 2.

Of the shift positions $P_{SH}$ of "P" through "M", the "P" and "N" positions are non-running positions that are selected when the vehicle is not to be run. These positions are non-drive positions in which the vehicle is unable to be driven because the power transmitting path in the automatic shifting portion 20 is interrupted by the first clutch C1 and the second clutch C2 both being released, as shown in the clutch and brake application chart in FIG. 2, for example. Also, the "R", "D", and "M" positions are running positions that are selected when the vehicle is to be run. These positions are drive positions in which the vehicle is able to be driven because the power transmitting path in the automatic shifting portion 20 is established by at least one of the first clutch C1 and the second clutch C2 being applied, as shown in the clutch and brake application chart in FIG. 2, for example. That is, these positions switch the power transmitting path to a power transmittable state by using the first clutch C1 and/or the second clutch C2.

More specifically, manually shifting the shift lever 52 from the "P" or "N" position into the "R" position applies the second clutch C2 such that the power transmitting path in the automatic shifting portion 20 changes from being interrupted (i.e., the power transmission-interrupted state) to being able to transmit power (i.e., the power transmittable state). Manually shifting the shift lever 52 from the "N" position into the "D" position applies at least the first clutch C1 such that the power transmitting path in the automatic shifting portion 20 changes from being interrupted to being able to transmit power. Also, manually shifting the shift lever 52 from the "R" position into the "P" or "N" position releases the second clutch C2 such that the power transmitting path in the automatic shifting portion 20 changes from being able to transmit power to being interrupted. Manually shifting the shift lever 52 from the "D" position into the "N" position releases both the first clutch C1 and the second clutch C2 such that the power transmitting path in the automatic shifting portion 20 changes from being able to transmit power to being interrupted.

Figure 7:
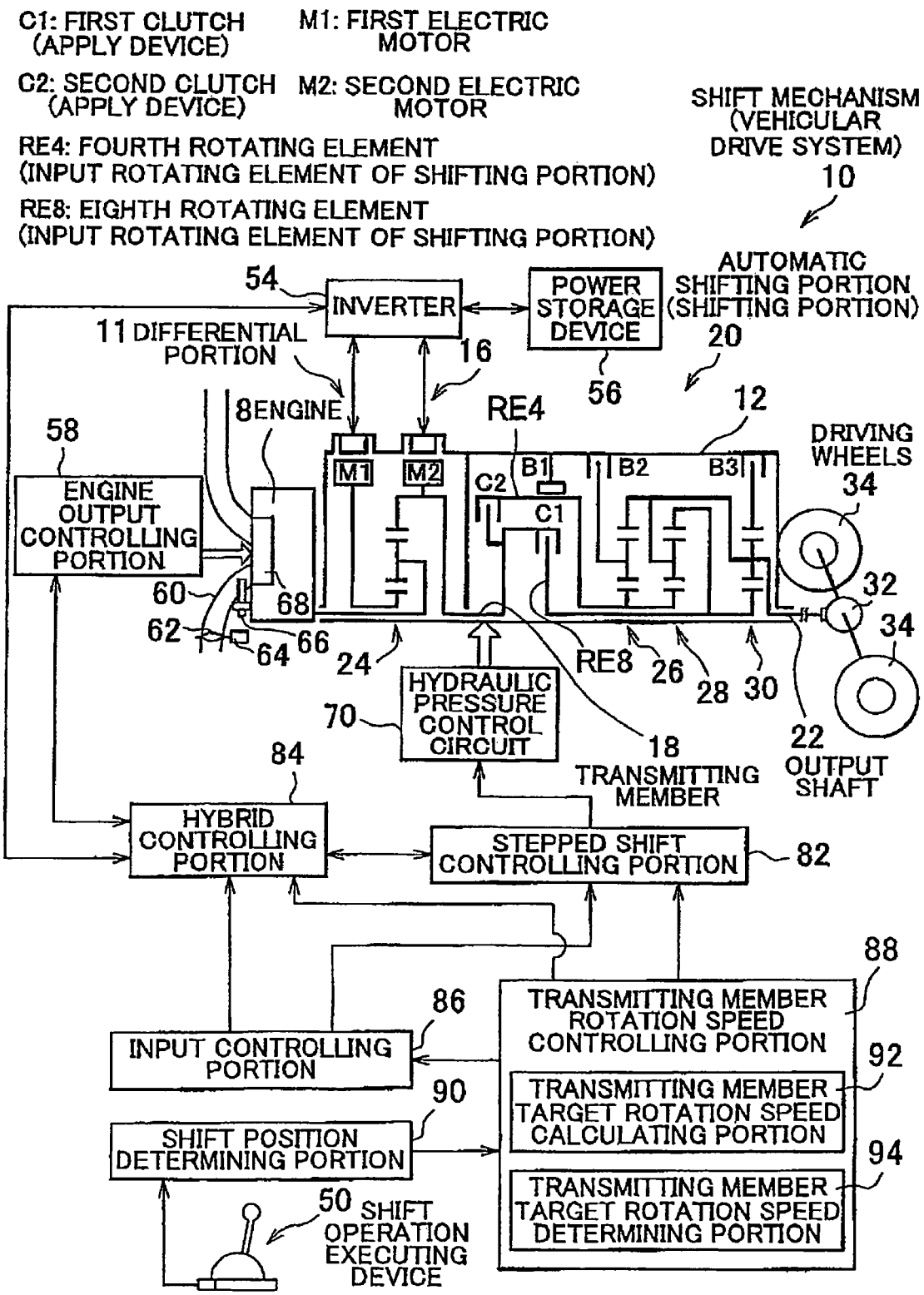
FIG. 7 is a functional block line diagram showing the main portions of the control functions of the electronic control apparatus shown in FIG. 4.
Figure 8:
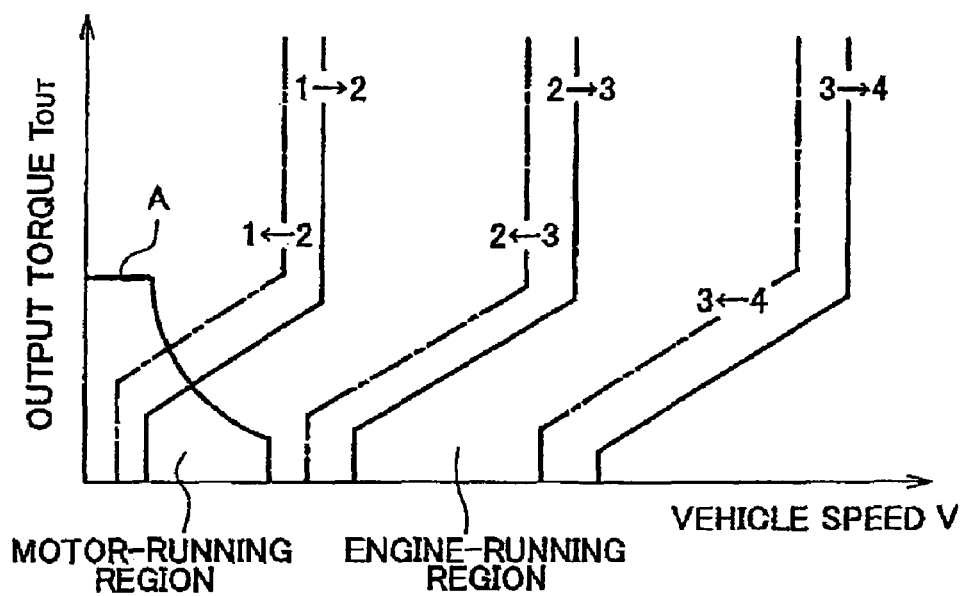
FIG. 8 is a view showing an example of a shift map used in shift control of the drive system and an example of a driving power source map used in driving power source switching control that switches between engine-running and motor-running, as well as the relationship between the two maps.

FIG. 7 is a functional block line diagram showing the main portions of the control functions of the electronic control apparatus 80. In FIG. 7, a stepped shift controlling portion 82 determines whether to execute a shift in the automatic shifting portion 20 based on the state of the vehicle, which is indicated by the required output torque $T_{OUT}$ of the automatic shifting portion 20 and the actual vehicle speed V, from a relationship (shift line graph, shift map) having upshift lines (i.e., the solid lines) and downshift lines (i.e., alternate long and short dash lines) that are stored in advance with the vehicle speed V and the output torque $T_{OUT}$ of the automatic shifting portion 20 as variables, as shown in FIG. 8. That is, the stepped shift controlling portion 82 determines the gear into which the automatic shifting portion 20 should shift and executes automatic shift control of the automatic shifting portion 20 to achieve that determined gear.

At this time, the stepped shift controlling portion 82 outputs a command (shift output command, hydraulic pressure command) to the hydraulic control circuit 70 to apply and/or release the hydraulic friction apply devices involved in the shift of the automatic shifting portion 20 so as to establish the gear according to the clutch and brake application chart shown in FIG. 2, for example. That is, the stepped shift controlling portion 82 outputs a command to execute a clutch-to-clutch shift by simultaneously releasing a release-side apply device that is involved in the shift of the automatic shifting portion 20 and applying an apply-side apply device that is involved in the shift of the automatic shifting portion 20. According to that command, the hydraulic pressure control circuit 70 activates the hydraulic actuators of the hydraulic friction apply devices involved in the shift by operating the linear solenoid valves SL in the hydraulic control circuit 70 so that the shift in the automatic shifting portion 20 is executed by releasing the release-side apply device and applying the apply-side apply device.

A hybrid controlling portion 84 operates the engine 8 in an efficient operating region while controlling the gear ratio $\gamma 0$ of the differential portion 11 functioning as an electric continuously variable transmission, by changing both the distribution of driving force from the engine 8 and the second electric motor M2 and the reaction force from the power generated by the first electric motor M1 so that they are optimum. For example, the hybrid controlling portion 84 calculates a target (i.e., required) output of the vehicle from the vehicle speed V and the accelerator depression amount $A_{CC}$ as the amount of output required by the driver at the speed V at which the vehicle is running at that time. The hybrid controlling portion 84 then calculates the necessary total target output from that target output of the vehicle and the charging required value, and calculates the target engine output taking into account transfer loss, loads from auxiliary devices, and the assist torque of the second motor M2 and the like to obtain that total target output. The hybrid controlling portion 84 then controls the engine 8 to obtain the engine speed $N_E$ and the engine torque $T_E$ that can achieve that target engine output, as well as controls the amount of power generated by the first electric motor M1.

Figure 9:
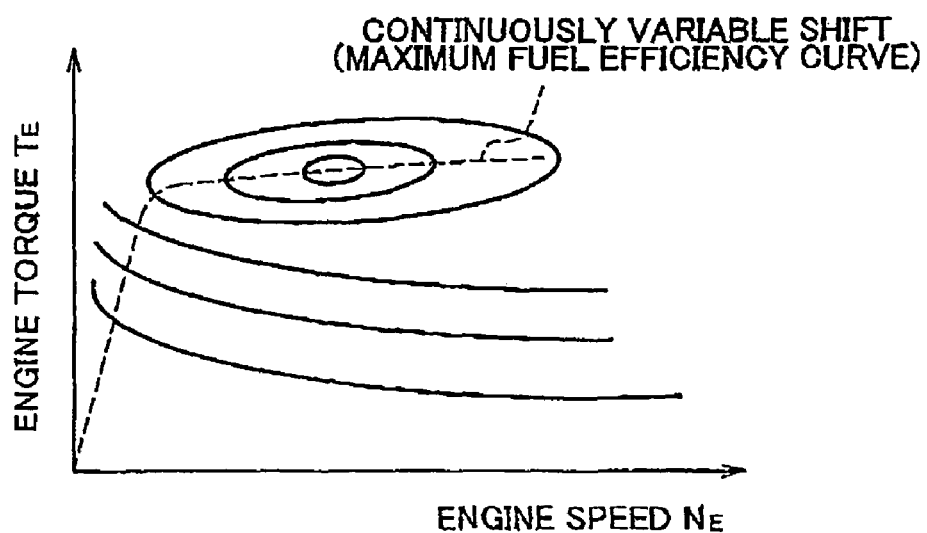
FIG. 9 is an example of a fuel efficiency map in which the broken line is the optimum fuel efficiency curve for the engine.

For example, the hybrid controlling portion 84 executes that control taking into account the speed of the automatic shifting portion 20 to improve power performance and fuel efficiency and the like. With this kind of hybrid control, the differential portion 11 is made to function as an electric continuously variable transmission in order to match the engine speed $N_E$ that is set so that the engine 8 operates in an efficient operating region and the rotation speed of the transmitting member 18 that is set by the vehicle speed V and the gear of the automatic shifting portion 20. That is, the hybrid controlling portion 84 controls the engine 8 so that it operates along the optimum fuel efficiency curve (fuel efficiency map, relationship) of the engine 8, as shown by the broken line in FIG. 9, which is obtained through testing beforehand and stored, in order to achieve both drivability and fuel efficiency during continuously variable running in a two-dimension coordinate system formed by the engine speed $N_E$ and the output torque of the engine 8 (i.e., the engine torque) $T_E$. For example, the hybrid controlling portion 84 determines the target value of the total gear ratio $\gamma T$ of the shift mechanism 10 to achieve the engine torque $T_E$ and engine speed $N_E$ for generating the necessary engine output to satisfy the target output (i.e., the total target output and the required driving force). The hybrid controlling portion 84 then controls the gear ratio $\gamma 0$ of the differential portion 11 taking into account the gear of the automatic shifting portion 20 so as to obtain that target value, and controls the total gear ratio $\gamma T$ so that it is continuous within the range through which shifting is possible.

At this time, the hybrid controlling portion 84 supplies the electric energy that was generated by the first electric motor M1 to the power storage device 56 and the second electric motor M2 via an inverter 54 so most of the power from the engine 8 is mechanically transmitted to the transmitting member 18. However, some of the power from the engine 8 is used (i.e., consumed) to generate power with the first electric motor M1, where it is converted into electric energy. This electric energy is then supplied through the inverter 54 to the second electric motor M2 where it is used to drive the second electric motor M2, and the power generated by the second electric motor M2 is then transmitted to the transmitting member 18. The equipment related to the process that extends from the generation of this electric energy until that electric energy is consumed by the second electric motor M2 converts some of the power from the engine 8 into electric energy and provides an electrical path for that electric energy until that electric energy is converted into mechanical energy.

Also, the hybrid controlling portion 84 keeps the engine speed $N_E$ substantially constant and controls it to an appropriate speed by controlling the first electric motor rotation speed $N_{M1}$ and/or the second electric motor rotation speed $N_{M2}$ using the electric CVT function of the differential portion 11, regardless of whether the vehicle is stopped or running. In other words, the hybrid controlling portion 84 controls the first electric motor rotation speed $N_{M1}$ and/or the second electric motor rotation speed $N_{M2}$ to an appropriate rotation speed while keeping the engine speed $N_E$ substantially constant and controlling it to an appropriate speed.

For example, as is evident from the alignment graph in FIG. 3, the hybrid controlling portion 84 increases the electric motor rotation speed $N_{M1}$ while keeping the second electric motor rotation speed $N_{M2}$ that is restricted by the vehicle speed V (i.e., the speed of the driving wheels 34) substantially constant when increasing the engine speed $N_E$ while the vehicle is running. Also, when the hybrid controlling portion 84 keeps the engine speed $N_E$ substantially constant while shifting the automatic shifting portion 20, it changes the first electric motor rotation speed $N_{M1}$ in the direction opposite the change in the second electric motor rotation speed $N_{M2}$ following a shift in the automatic shifting portion 20 while keeping the engine speed $N_E$ substantially constant.

Also, the hybrid controlling portion 84 outputs several commands either individually or in combination to the engine output controlling portion 58. These commands are i) a command to control the electronic throttle valve 62 open and closed using the throttle actuator 64 for throttle control, ii) a command to control the fuel injection quantity and injection timing from the fuel injection apparatus 66 for fuel injection control, and iii) a command to control the ignition timing with the ignition apparatus 68 such as an igniter for ignition timing control. That is, the hybrid controlling portion 84 functionally includes an engine output controlling portion for executing output control of the engine 8 to generate the necessary engine output.

For example, the hybrid controlling portion 84 basically executes throttle control to increase the throttle valve opening amount $\theta_{TH}$ as the accelerator depression amount $A_{CC}$ increases by driving the throttle actuator 60 based on the accelerator depression amount $A_{CC}$ from a relationship stored beforehand, not shown. Also, the engine output controlling portion 58 executes engine torque control by controlling the fuel injection by the fuel injection apparatus 66 for fuel injection control and controlling the ignition timing by the ignition apparatus 68 such as an igniter for ignition timing control and the like in addition to controlling the electronic throttle valve 62 open and closed using the throttle actuator 64 for throttle control.

Also, the hybrid controlling portion 84 can run the vehicle using the motor (i.e., motor-running) by using the electric CVT function (differential operation) of the differential portion 11 regardless of whether the engine 8 is stopped or idling. For example, the hybrid controlling portion 84 executes the motor-running in the relatively low output torque $T_{OUT}$ region, i.e., the low engine torque $T_E$ region, in which the engine efficiency is typically worse than it is in the high torque region, or the relatively low vehicle speed V region, i.e., low load region. During motor running, the hybrid controlling portion 84 is also able to keep the engine speed $N_E$ at zero or substantially zero as necessary by controlling the first electric motor rotation speed $N_{M1}$ to a negative rotation speed, e.g., by rotating the first electric motor M1 idly, using the electric CVT function (differential operation) of the differential portion 11 in order to suppress drag from the stopped engine 8 and thus improve fuel efficiency.

Also, in the engine-running region as well, so-called torque assist for assisting the power of the engine 8 is made possible by the hybrid controlling portion 84 supplying electric energy from the first electric motor M1 and/or the electric energy from the power storage device 56 through the electrical path described above to the second electric motor M2, and driving that second electric motor M2 so as to apply torque to the driving wheels 34.

Also, the hybrid controlling portion 84 places the first electric motor M1 in a no-load state thus allowing it to rotate freely (i.e., idly). As a result, the differential portion 11 can be placed in a state equivalent to the state in which the transmission of torque is interrupted, i.e., placed in a state in which the power transmitting path in the differential portion 11 is interrupted, and there is no output from the differential portion 11. That is, the hybrid controlling portion 84 can place the differential portion 11 in a neutral state in which the power transmitting path is electrically interrupted by placing the first electric motor M1 in a no-load state.

Here, if the rotation speed of the transmitting member 18 and the rotation speed of either the eighth rotating element RE8 (see FIG. 1) that is engaged via the first clutch C1 in first gear or the fourth rotating element RE4 (see FIG. 1) that is engaged via the second clutch C2 in reverse are controlled to a synchronous speed when the shift lever 52 is manually shifted from the "N" position, which represents a power transmission-interrupted state, into the "D" position or the "R" position, which represents a power transmittable state, as is done in related art, the rotation speed of the transmitting member 18, i.e., the rotation speed of the second electric motor M2 does not change. Therefore, conventionally, the time at which first clutch C1 or the second clutch C2 starts to be applied and the time at which the first clutch C1 or the second clutch C2 is completely applied were not able to be determined by the change in the rotation speed of the second electric motor M2 (i.e., the transmitting member 18) so instead they were determined by an elapsed time that is set through testing or the like in advance (i.e., timer control). In this case, the elapsed time had to be set longer taking into account variation in the amount of time that it takes for the clutch to be applied, which varies according to the running state and the like of the vehicle. This resulted in the possibility of a delay in the torque increase that occurs when a clutch is applied. Therefore, in this example embodiment, an input controlling portion 86 and a transmission member rotation speed control portion 88 and the like, which will be described later, are used to improve the torque response of an apply device. Incidentally, the fourth rotating element RE4 and the eighth rotating element RE8 correspond to input rotating members of the shifting portion of the invention.

A shift position determining portion 90 determines the current position of the shift lever 52 based on a signal indicative of the shift position $P_{SH}$ of the shift lever 52, and determines whether the position of the shift lever 52 is the "N" position in which the power transmitting path within the shift mechanism 10 is interrupted. The shift position determining portion 90 also determines based on the shift position $P_{SH}$ whether the shift lever 52 has been manually shifted from the "N" position to the "D" position or the "R" position.

A transmitting member target rotation speed calculating portion 92 calculates a target rotation speed $N_{AIM}$ of the transmitting member 18 when the automatic shifting portion 20 has been shifted into first gear or reverse by the shift lever 52 being manually shifted from the "N" position into the "D" or the "R position.

When the shift lever 52 is shifted into the "D" position", first gear is established, i.e., the first clutch C1 and the third brake B3 are applied. At this time, the transmitting member 18 is connected via the first clutch C1 to the eighth rotating element RE8 that functions as the input rotating member of the automatic shifting portion 20. Here, first, the rotation speed of this eighth rotating element RE8 is calculated. The rotation speed of the eighth rotating element RE8 is calculated based on the rotation speed $N_{OUT}$ of the output shaft 22 of the automatic shifting portion 20 and the gear ratio $\gamma 1$ of first gear (i.e., $=N_{OUT} \times \gamma 1$). Then, the target rotation speed $N_{AIM}$ of the transmitting member 18 is set so that a predetermined rotation speed difference (or a predetermined rotation speed ratio) such as 50 to 200 rpm, for example, is created between the target rotation speed $N_{AIM}$ of the transmitting member 18 and the calculated rotation speed of the eighth rotating element RE8. Incidentally, if the rotation speed difference is small, a change in the rotation speed is difficult to detect. On the other hand, if the rotation speed difference is large, shift shock tends to increase. Therefore, the appropriately rotation speed difference is set accordingly.

Also, when the shift lever 52 is shifted into the "R" position, reverse is established, i.e., the second clutch C2 and the third brake B3 are applied. At this time, the transmitting member 18 is connected via the second dutch C2 to the fourth rotating element RE4 that functions as the input rotating member of the automatic shifting portion 20. Here, first, the rotation speed of this fourth rotating element RE4 is calculated. The rotation speed of the fourth rotating element RE4 is calculated based on the rotation speed $N_{OUT}$ of the output shaft 22 of the automatic shifting portion 20 and the gear ratio γR of reverse gear (i.e., $=N_{OUT} \times \gamma R$). Then, the target rotation speed $N_{AIM}$ of the transmitting member 18 is set so that a predetermined rotation speed difference (or a predetermined rotation speed ratio) such as 50 to 200 rpm, for example, is created between the target rotation speed $N_{AIM}$ of the transmitting member 18 and the calculated rotation speed of the fourth rotating element RE4.

A transmitting member rotation speed controlling portion 88 controls the rotation speed $N_{18}$ of the transmitting member 18 so that it comes to match the target rotation speed $N_{AIM}$ that was calculated by the transmitting member target rotation speed calculating portion 92 described above. That is, the transmitting member rotation speed controlling portion 88 controls the rotation speed $N_{18}$ of the transmitting member 18 so that a predetermined rotation speed difference is obtained between the rotation speed $N_{18}$ of the transmitting member 18 and the rotation speed of the eighth rotating element RE8 or the fourth rotating element RE4. That is, the rotation speed $N_{18}$ of the transmitting member 18 is controlled so that the difference between the rotation speed $N_{18}$ of the transmitting member 18 before the apply device (i.e., the first clutch C1 or the second clutch C2) is applied and the rotation speed $N_{18}$ of the transmitting member 18 after that apply device is applied comes to match a predetermined rotation speed difference (or predetermined rotation speed ratio). For example, when the shift lever 52 is in the "N" position, the target rotation speed $N_{AIM}$ of the transmitting member 18 is calculated by the transmitting member target rotation speed calculating portion 92 and the rotation speed $N_{18}$ of the transmitting member 18 is controlled by the first electric motor M1 and/or the second electric motor M2 so that it comes to match the target rotation speed $N_{AIM}$.

A transmitting member target rotation speed determining portion 94 determines whether the rotation speed $N_{18}$ of the transmitting member 18 is maintained at the target rotation speed $N_{AIM}$ that was calculated by the transmitting member target rotation speed calculating portion 92 when the first clutch C1 or the second clutch C2 is applied by the shift lever 52 being manually shifted into the "D" or the "R" position.

The input controlling portion 86 executes shift control for first gear or reverse based on the determination made by the transmitting member target rotation speed determining portion 94. First, a case in which the transmitting member target rotation speed determining portion 94 has determined that the rotation speed $N_{18}$ of the transmitting member 18 is being maintained at the target rotation speed $N_{AIM}$ will be described. When the shift lever 52 is manually shifted from the "N" position into the "D" position, for example, the first clutch C1 is applied. Because there is a predetermined rotation speed difference between the transmitting member 18 and the eighth rotating element RE8 that is connected to that transmitting member 18 via the first clutch C1, the rotation speed of the transmitting member 18 (i.e., the second electric motor M2) changes when the first clutch C1 is applied. By detecting that change in the rotation speed that occurs when the clutch is applied it is possible to determine the point (i.e., time) at which the first clutch C1 starts to be applied and the point (i.e., time) at which the first clutch C1 is completely applied. As a result, apply pressure control (i.e., sweep control) that controls the torque (i.e., apply pressure) of the first clutch C1 to gradually increase is possible so application can be performed rapidly.

Also, the input controlling portion 86 controls the output torque of the second electric motor M2 to a constant value between the time the first clutch C1 starts to apply until the first clutch C1 is completely applied (i.e., during apply control). As a result, the drive torque that is transmitted to the eighth rotating element RE8 increases smoothly according to sweep control of the apply pressure of the first clutch C1.

Similarly, when the shift lever 52 is manually shifted from the "N" position to the "R" position, for example, the second clutch C2 is applied. Because there is a predetermined rotation speed difference between the transmitting member 18 and the fourth rotating element RE4 that is connected to that transmitting member 18 via the first clutch C2, the rotation speed $N_{18}$ of the transmitting member 18 (i.e., the second electric motor M2) changes when the second clutch C2 is applied. By detecting that change in the rotation speed that occurs when the clutch is applied it is possible to determine the point (i.e., time) at which the second clutch C2 starts to be applied and the point (i.e., time) at which the second clutch C2 is completely applied. As a result, apply pressure control (i.e., sweep control) that controls the torque (i.e., apply pressure) of the second clutch C2 to gradually increase is possible so application can be performed rapidly.

Also, the input controlling portion 86 controls the output torque of the second electric motor M2 to a constant value between the time the second clutch C2 starts to apply until the second clutch C2 is completely applied (i.e., during apply control). As a result, the drive torque that is transmitted to the fourth rotating element RE4 increases smoothly according to sweep control of the apply pressure of the second clutch C2.

Now a case in which the transmitting member target rotation speed determining portion 94 has determined that the rotation speed $N_{18}$ of the transmitting member 18 has not reached the target rotation speed $N_{AIM}$ will be described. This corresponds to a case in which, more specifically for example, the difference between the rotation speed $N_{18}$ of the transmitting member 18 and rotation speed of the eighth rotating element RE8 or the fourth rotating element RE4 is substantially zero. Incidentally, normally the rotation speed $N_{18}$ of the transmitting member 18 is controlled to the target rotation speed $N_{AIM}$ by the transmitting member rotation speed controlling portion 88 when the shift lever 52 is in the "N" position. However, when the vehicle is stopped and the engine 8 is driven to charge the power storage device 56 because the state-of-charge SOC of the power storage device 56 is low, for example, the rotation speed of the second electric motor M2, i.e., the rotation speed of the transmitting member 18, is substantially zero. At this time, the rotation speed $N_{18}$ of the transmitting member 18 and the rotation speed of the eighth rotating element RE8 or the fourth rotating element RE4 are equal at substantially zero so the predetermined rotation speed difference is not reached. As a result, it is determined that the rotation speed $N_{18}$ of the rotating member 18 has not reached the target rotation speed $N_{AIM}$.

If it is determined that the rotation speed $N_{18}$ of the rotating member 18 has not reached the target rotation speed $N_{AIM}$, the time at which the clutch starts to be applied and the time at which the clutch is completely applied are unable to be determined by the change in the rotation speed of the second electric motor M2 (i.e., the transmitting member 18) that occurs when the clutch is applied, so the input controlling portion 86 is unable to perform apply pressure control of the first clutch C1 or the second clutch C2. Therefore, the determination as to whether the first clutch C1 or the second clutch C2 are completely applied is made by determining whether a predetermined period of time that is set beforehand has passed (i.e., according to timer control). That is, the first clutch C1 or the second clutch C2 is determined to be applied after a predetermined period of time, which has been set in advance, has passed. For example, the input controlling portion 86 automatically determines that the clutch is completely applied after a predetermined period of time has passed after the shift lever 52 was manually shifted from the "N" position into the "D" position, and thereafter gradually increases the output torque of the second electric motor M2. Incidentally, this predetermined period of time is set to be relatively long so that the clutch has time to apply regardless of the running state and the like of the vehicle.

Figure 10:
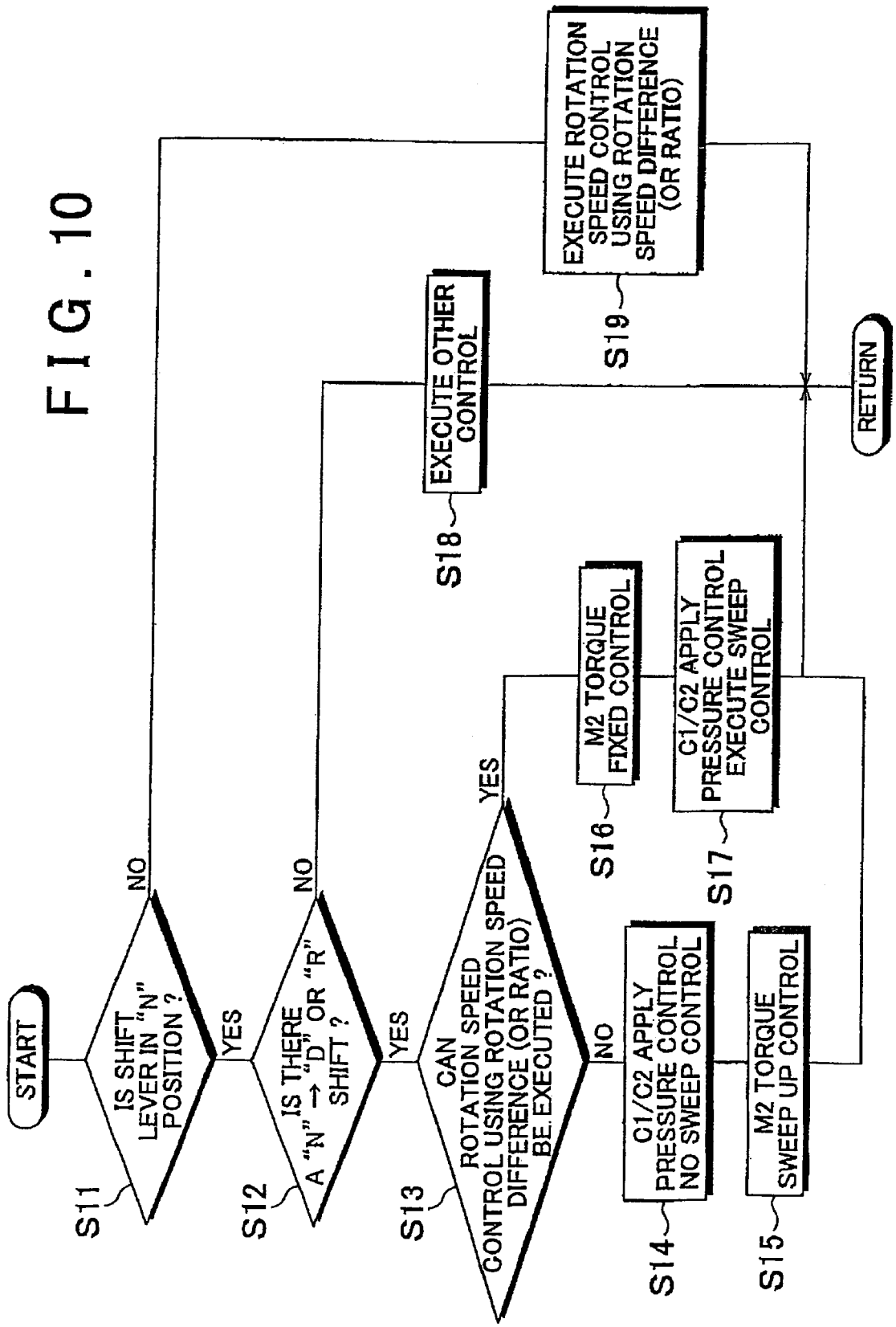
FIG. 10 is a flowchart illustrating a routine of a control operation of the electronic control apparatus shown in FIG. 4, i.e., a control operation of the apply devices when performing a shift from a non-drive position to a drive position.

FIG. 10 is a flowchart illustrating the main portion of a control operation of the electronic control apparatus 80, i.e., of shift control in which the driver can feel a smooth increase in drive torque when the shift lever 52 is shifted from the "N" position into the "D" or "R" position. The routine in this flowchart is repeatedly executed at extremely short time cycles of several msec to several tens of msec, for example.

First, in step S11, which corresponds to the shift position determining portion 90, it is determined whether the shift position $P_{SH}$ of the shift lever 52 is in the "N" position which is a non-drive position that places the power transmitting path in a power transmission-interrupted state. If the determination in step S11 is NO, the rotation speed $N_{18}$ of the transmitting member 18 is controlled to the target rotation speed $N_{AIM}$ in step S19 which corresponds to the transmitting member rotation speed controlling portion 88. More specifically, the transmitting member target rotation speed calculating portion 92 calculates the target rotation speed $N_{AIM}$ of the transmitting member 18, and the transmitting member rotation speed controlling portion 88 controls the rotation speed $N_{18}$ of the transmitting member so that it reaches that target rotation speed $N_{AIM}$ by controlling the first electric motor M1 and/or the second electric motor M2.

If, on the other hand, the determination in step S11 is YES, it is determined in step S12, which corresponds to the shift position determining portion 90, whether the shift lever 52 has been shifted from the "N" position, which is a non-drive position, into the "D" position or the "R" position, which are both drive positions that place the power transmitting path in a power transmittable state.

If the determination in step S12 is YES, then in step S13, which corresponds to the transmitting member target rotation speed calculating portion 92 and the transmitting member target rotation speed determining portion 94, the target rotation speed $N_{AIM}$ of the transmitting member 18 is calculated, and it is determined whether the rotation speed $N_{18}$ of the transmitting member 18 is being maintained at that target rotation speed $N_{AIM}$.

If the determination in step S13 is NO, i.e., if the rotation speed difference between the transmitting member 18 and the eighth rotating element RE8 that is engaged to the transmitting member 18 by the first clutch C1 (when the shift lever 52 is shifted into the "D" position) or the fourth rotating element RE4 that is engaged to the transmitting member 18 by the second clutch C2 (when the shift lever 52 is shifted into the "R" position) has not reached the predetermined rotation speed difference, then the first clutch C1 or the second clutch C2 is applied according to timer control in step S14 which corresponds to the input controlling portion 86. Then in step S14 it is automatically determined that application is complete after a predetermined period of time has passed according to timer control, and in step S15, which corresponds to the input controlling portion 86, the drive torque is transmitted to the driving wheels 34 in such a manner that it gradually increases by gradually increasing the output torque of the second electric motor M2.

If, on the other hand, the determination in step S13 is YES, the output torque of the second electric motor M2 is controlled so that it takes a constant value in step S16 which corresponds to the input controlling portion 86. Then in step S17, which corresponds to the input controlling portion 86, the drive torque is transmitted to the driving wheels 34 in such a manner that it gradually increases by executing apply pressure control (i.e., sweep control) of the first clutch C1 or the second clutch C2.

Figure 11:
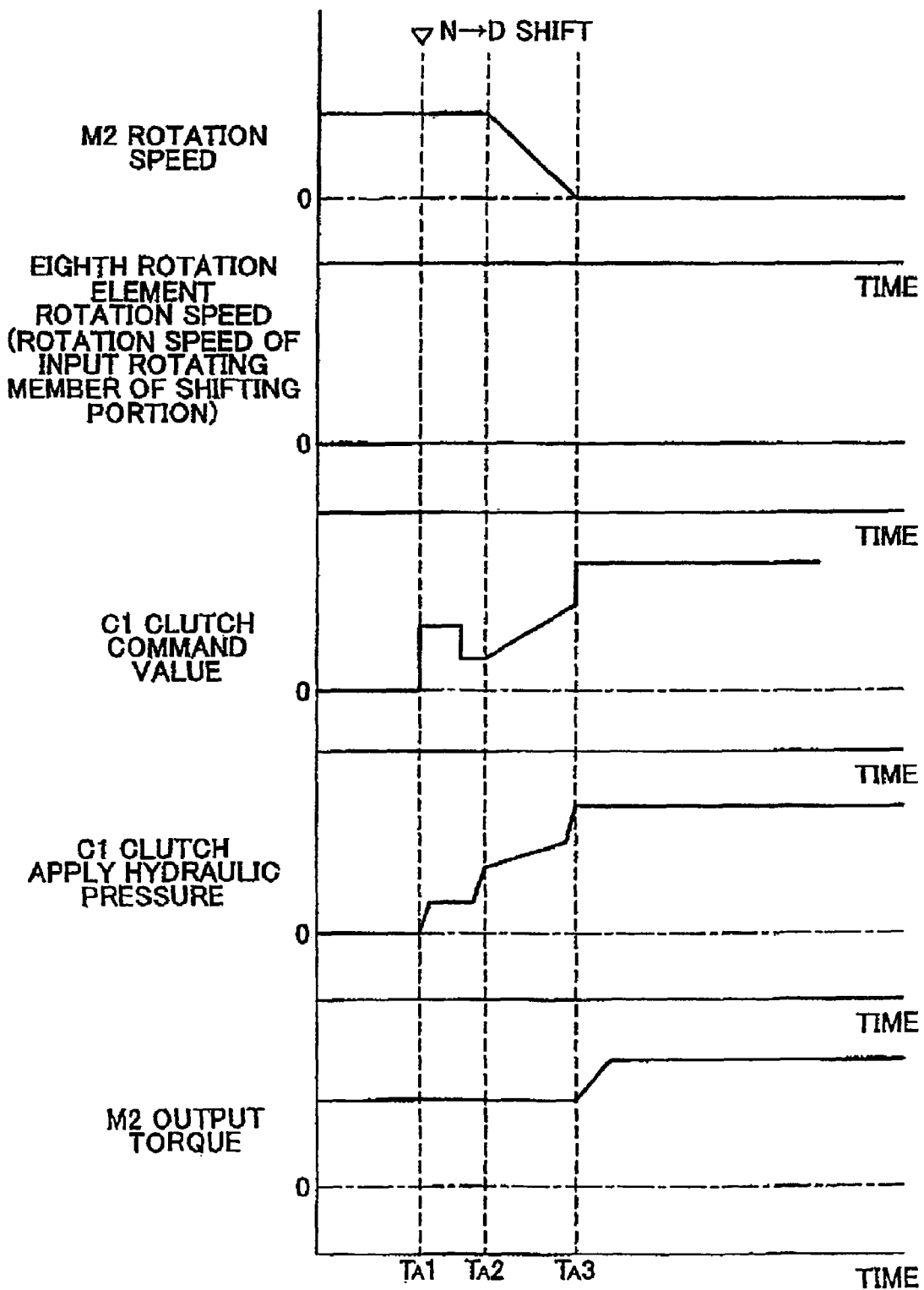
FIG. 11 is a time chart illustrating the control operation in the flowchart in FIG. 10.
Figure 12:
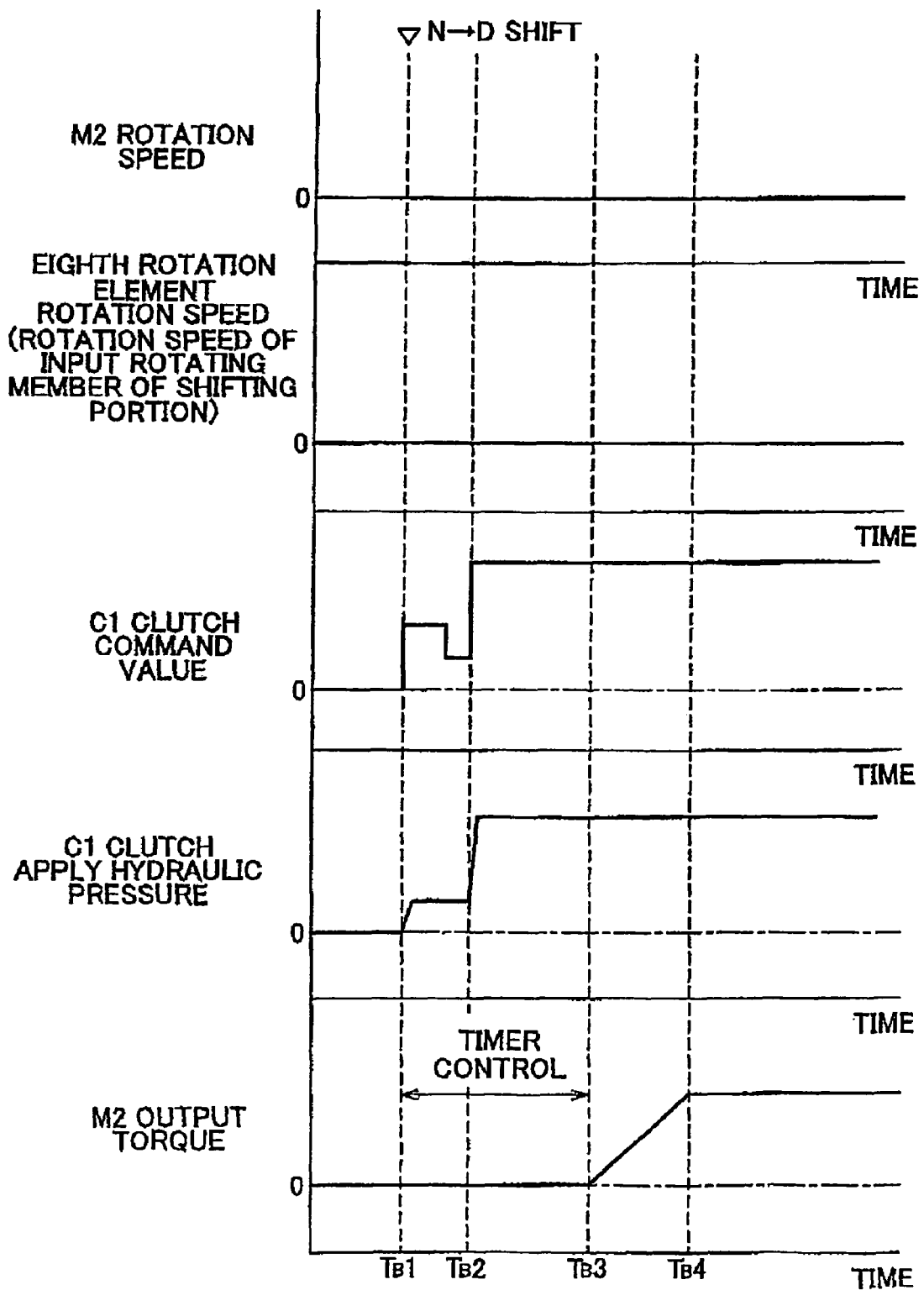
FIG. 12 is another time chart illustrating the control operation in the flowchart in FIG. 10.

FIGS. 11 and 12 are examples of time charts illustrating the control operation in the flowchart in FIG. 10, and show the operation control when the shift lever 52 is shifted from the "N" position into the "D" position. FIGS. 11 and 12 both show the control operation while the vehicle is stopped. FIG. 11 shows the control operation when the rotation speed $N_{18}$ of the transmitting member 18 has reached the target rotation speed $N_{AIM}$, and FIG. 12 shows the control operation when the rotation speed $N_{18}$ of the transmitting member 18 has not reached the target rotation speed $N_{AIM}$.

In FIG. 11, first, when the shift lever 52 has been shifted into the "N" position, the rotation speed of the eighth rotating element RE8 is substantially zero because the vehicle is stopped, and the second electric motor M2 (i.e., the transmitting member 18) is rotating while maintaining a predetermined rotation speed difference with respect to the eighth rotating element RE8. Incidentally, output torque of the second electric motor M2 at this time is generated in order to rotate the transmitting member 18 at a speed that yields that predetermined rotation speed difference, and is controlled so that it is maintained at a relatively small constant value. When the shift lever 52 is shifted into the "D" position at time $T_A1$ in this state, the command value (for the apply pressure) of the first clutch C1 suddenly increases and is then held for a set period of time, after which it decreases and is again held for a set period of time (time $T_A1$ to time $T_A2$).

As a result, because the apply pressure of the first clutch C1 is rapidly increased, a piston, not shown, of the first clutch C1 makes a fast stroke (i.e., travels quickly within a cylinder of the first clutch C1) up to a position right before it presses against a friction plate of the first clutch C1 (time $T_A1$ to time $T_A2$). Then at time $T_A2$, the piston of the first clutch C1 starts to press against the friction plate of the first clutch C1. This time $T_A2$ is determined by detecting a change (i.e., decrease) in the rotation speed of the second electric motor M2. When the application start time $T_A2$ is determined, the command value of the first clutch C1 is gradually increased. This gradual increase in the command value of the first clutch C1 is accompanied by a gradual increase in the apply pressure of the first clutch C1. As the first clutch C1 applies, the second electric motor rotation speed $N_{M2}$ decreases. The time at which the second electric motor rotation speed $N_{M2}$ stops decreasing, i.e., $T_A3$ in FIG. 11, is determined to be the time at which the first clutch C1 has become completely applied. At time $T_A3$, enough supply pressure to prevent the clutch C1 from slipping is supplied. Also, the output torque of the second electric motor M2 is increased to generate pseudo creep torque.

In FIG. 12, first, when the shift lever 52 has been shifted into the "N" position, the rotation speed of the eighth rotating element RE8 is substantially zero because the vehicle is stopped, and rotation speed of the second electric motor M2 (i.e., the transmitting member 18) is also substantially zero so the predetermined rotation speed difference is not obtained. As a result, the second electric motor rotation speed $N_{M2}$ remains at zero even when the first clutch C1 is applied so apply pressure control of the first clutch C1 based on a change in the second electric motor rotation speed $N_{M2}$ is not possible. Therefore, timer control is executed based on the time at which the shift lever 52 is shifted into the "D" position, i.e., time $T_B1$. When this shift is performed at time $T_B1$, the command value (for the apply pressure) of the first clutch C1 suddenly increases and is then held for a set period of time, after which it decreases and is again held for a set period of time (time $T_B1$ to time $T_B2$). As a result, because the apply pressure of the first clutch C1 is rapidly increased, a piston, not shown, of the first clutch C1 makes a stroke (i.e., travels within a cylinder of the first clutch C1) and starts to press against a friction plate of the first clutch C1. Incidentally, this time $T_B2$ is set in advance and when it is reached, the command value of the first dutch C1 suddenly increases automatically, and as it does so, the apply pressure of the first clutch C1 also suddenly increases such that the first clutch C1 is progressively applied. Then at time $T_B3$ it is automatically determined that the first clutch C1 is completely applied so the output torque of the second electric motor M2 is gradually increased to generate pseudo creep torque. Then at time $T_B4$, the drive torque from the second electric motor M2 is controlled so that it is constant. Incidentally, times $T_B1$ to $T_B3$ are set relatively long taking into account variation in the amount of time that it takes for the clutch to be applied, which varies according to the running state and the like of the vehicle.

As described above, according to this example embodiment, by controlling the rotation speed $N_{18}$ of the transmitting member 18 such that a predetermined rotation speed difference is obtained between the rotation speed $N_{18}$ of the transmitting member 18 and the rotation speed of the eighth rotating element RE8 or the fourth rotating element RE4, the point (i.e., time) at which the first clutch C1 or second clutch C2 starts to be applied and the point (i.e., time) at which the first clutch C1 or second clutch C2 is completely applied can be determined by detecting a change in the rotation speed of the second electric motor M2 that is connected to the transmitting member 18 when the transmitting member 18 and the eighth rotating element RE8 or the fourth rotating element RE4 are engaged by the first clutch C1 or the second clutch C2. As a result, apply pressure control (sweep control) of the first clutch C1 and the second clutch C2 becomes possible. Accordingly, a shift operation can be executed quickly, which enables torque response to be improved.

Also according to this example embodiment, when, as a result of the control by the transmitting member rotation speed controlling portion 88, the rotation speed $N_{18}$ of the transmitting member 18 reaches a speed at which there is a predetermined rotation speed difference between it and the rotation speed of the eighth rotating element RE8 or the fourth rotating element RE4, the torque (i.e., apply pressure) of the first clutch C1 or the second clutch C2 is controlled to gradually increase. This apply pressure control enables the drive torque to the driving wheels 34 (i.e., output shaft) to be increased smoothly.

Further, according to this example embodiment, the output torque of the second electric motor M2 to a constant (i.e., fixed) value during apply pressure control of the first clutch C1 or the second clutch C2. As a result, as the apply pressure of the first clutch C1 or second clutch C2 is controlled so that it gradually increases, the output torque of the second electric motor M2 is transmitted to the driving wheels 34 (i.e., output shaft) in a manner such that it also gradually increases, thus enabling the drive torque to the driving wheels to be increased smoothly.

Also according to this example embodiment, even if the rotation speed $N_{18}$ of the transmitting member 18 has not reached a rotation speed at which the predetermined rotation speed difference is obtained (i.e., even if the predetermined rotation speed difference is not obtained), an increase in drive torque from the second electric motor M2 is still transmitted to the driving wheels 34 by the input controlling portion 86 gradually increasing the output torque of the second electric motor M2 after the first clutch C1 or the second clutch C2 has been completely applied.

Further, according to this example embodiment, if the rotation speed $N_{18}$ of the transmitting member 18 does not reach a rotation speed at which the predetermined rotation speed difference is obtained (i.e., even if the predetermined rotation speed difference is not obtained), the first clutch C1 or the second clutch C2 is determined to be completely applied when a predetermined period of time, which is set in advance, has passed. Therefore, an increase in the drive torque from the second electric motor M2 is transmitted to the driving wheels 34 by gradually increasing the output torque from the second electric motor M2 after this predetermined period of time has passed.

Also according to this example embodiment, the electric differential portion 11 and the automatic shifting portion 20 make up a continuously variable transmission so the drive torque can be changed smoothly. Incidentally, the electric differential portion 11 is able to function not only as an electric continuously variable transmission by changing gear ratios continuously (i.e., in a stepless manner), but also as a stepped transmission by changing gear ratios in a stepped manner.

Further, according to this example embodiment, for example, the electric differential portion 11, which can be made to function as an electric continuously variable transmission, and the stepped automatic shifting portion 20 make up a continuously variable transmission so drive torque can be changed smoothly. At the same time, when the gear ratio of the electric differential portion 11 is controlled so that it is constant, a state equivalent to that of a stepped transmission is created by the electric differential portion 11 and the stepped automatic shifting portion 20 such that the overall shift ratio of the vehicular drive system changes in a stepped manner and drive torque can be obtained quickly.

While example embodiments of the invention have been described in detail with reference to the drawings, the invention is not limited to these example embodiments or constructions.

For example, in the foregoing example embodiment, the rotation speed $N_{18}$ of the transmitting member 18 is controlled by the transmitting member rotation speed controlling portion 88 such that a predetermined rotation speed difference is obtained between it (i.e., the rotation speed $N_{18}$ of the transmitting member 18) and the rotation speed of the eighth rotating element RE8 or the fourth rotating element RE4. However, the invention is not limited to this predetermined rotation speed difference. For example, the invention may also be applied in a case where the rotation speed $N_{18}$ of the transmitting member 18 is controlled such that a predetermined rotation speed ratio that was set by testing or the like is obtained between the rotation speed $N_{18}$ of the transmitting member 18 and the rotation speed of the eighth rotating element RE8 or the fourth rotating element RE4.

Also, the foregoing example embodiment describes an apply operation when the shift lever 52 is shifted from the "N" position into the "D" or "R" position. However, the same effect that is obtained when the shift lever 52 is shifted from the "N" position into the "D" or "R" position may also be obtained when the shift lever 52 is shifted from the "P" position, which is a non-drive position, into the "D" or "R" position.

Also, in the foregoing example embodiment, the differential portion 11 functions as an electric continuously variable transmission that continuously (i.e., in a stepped manner) changes the gear ratio γ0 from the minimum value γ0min to the maximum value γ0max. However, the invention may also be applied to a case in which the gear ratio γ0 of the differential portion 11 is changed in a stepped manner, instead of continuously, using differential operation, for example.

Further, in the foregoing example embodiment, the differential portion 11 may be provided with a differential limiting device in the power split device 16, which makes the differential portion 11 also function as at least a forward two-speed stepped transmission by limiting differential operation.

Also, in the power split device 16 in the foregoing example embodiment, the first carrier CA1 is connected to the engine 8, the first sun gear S1 is connected to the first electric motor M1, and the first ring gear R1 is connected to the transmitting member 18. However, the connective relationships are not necessarily limited to these. For example, the engine 8, the first electric motor M1, and the transmitting member 18 may be connected to any of the three elements CA1, S1, and R1 of the first planetary gear set 24.

Also, in the foregoing example embodiment, the engine 8 is directly connected to the input shaft 14. However, as long as it is operatively linked via a gear or a belt or the like, it does not necessarily have to be arranged on the same axis as the input shaft 14.

Also, in the foregoing example embodiment, the first electric motor M1 and the second electric motor M2 are arranged concentric with the input shaft 14, with the first electric motor M1 being connected to the first sun gear S1 and the second electric motor M2 being connected to the transmitting member 18. However, the first electric motor M1 and the second electric motor M2 do not necessarily have to be arranged in this way. For example, the first electric motor M1 may be connected to the first sun gear S1 operatively via a gear, a belt, or reduction gears or the like, and the second motor M2 may be connected to the transmitting member 18 also operatively via a gear, a belt, or reduction gears or the like.

Also in the foregoing example embodiment, the hydraulic friction apply devices such as the first clutch C1 and the second clutch C2 may be magnetic-particle type apply devices such as powder (magnetic particle) clutches, electromagnetic type apply devices such as electromagnetic clutches, or mechanical type apply devices such as mesh type dog clutches or the like. When an electromagnetic clutch is used, for example, the hydraulic pressure control circuit 70 is formed of, for example, an electromagnetic switching device or a switching device that switches an electric command signal circuit to the electromagnetic clutch, instead of a valve device that switches the hydraulic circuit.

Also, in the foregoing example embodiment, the automatic shifting portion 20 is connected in series to the differential portion 11 via the transmitting member 18. Alternatively, however, a counter shaft may be provided parallel with the input shaft 14 and the automatic shifting portion 20 may be arranged concentric on that counter shaft. In this case, the differential portion 11 and the automatic shifting portion 20 may be connected so that power can be transmitted via a pair of transmitting members that include a counter gear set, a sprocket, and chain as the transmitting member 18, for example.

Also, the power split device 16, which serves as the differential mechanism in the foregoing example embodiment, may also be a differential gear unit in which a pinion that is rotatably driven by the engine and a pair of umbrella gears that are in mesh with that pinion are operatively linked to the first electric motor M1 and the transmitting member 18 (i.e., the second electric motor M2), for example.

Also, the power split device 16 in the foregoing example embodiment is made up of a single planetary gear set, but it may also be made up of two or more planetary gear sets such that when it is in a non-differential state (i.e., a fixed shift state) it functions as a transmission with three or more speeds. Also, that planetary gear set is not limited to being a single pinion type planetary gear set. That is, it may also be a double pinion type planetary gear set.

Also, the shift operation executing device 50 in the foregoing example embodiment is provided with the shift lever 52 that is operated to select any one of a plurality of various shift positions $P_{SH}$. However, instead of the shift lever 52, for example, a switch such as a pushbutton switch or a sliding switch that can select any one of the plurality of various shift positions $P_{SH}$ may be provided, or a device that switches among the plurality of various shift positions $P_{SH}$ in response to the voice of the driver without relying on a manual operation may be provided, or a device that switches among the plurality of various shift positions $P_{SH}$ according to a foot operation may be provided. Also, in the foregoing example embodiment, the shift range is set by shifting the shift lever 52 into the "M" position. Alternatively, however, the gear may be set, i.e., the highest gear in each shift range may be set as the gear. In this case, the gear may be switched and a shift executed in the automatic shifting portion 20. For example, when the shift lever 52 is manually operated into an upshift position "+" or a downshift position "−" of the "M" position, any gear from 1st gear to 4th gear may be set in the automatic shifting portion 20 according to the operation of the shift lever 52. Also, although in this specification the term "gear" (as in "first gear, "second gear" etc.) is used, it is to be understood that it does not necessarily refer to the presence of a physical gear. That is, the term "gear" simply refers to the state of an apparatus, such as a transmission, which yields a particular relation of torque and speed between a driving portion (i.e., input) and a driven portion (i.e., output), or which permits the driven portion to rotate in either the same direction as the driving portion (i.e., the forward rotation) or the opposite direction of the driving portion (i.e., reverse rotation). Accordingly, the term "gear" in this sense is interchangeable with the term "speed" (as in "five-speed transmission"). This concept also applies to the term "gear ratio" and thus the term "gear ratio" is interchangeable with the term "speed ratio".

While some embodiments of the invention have been illustrated above, it is to be understood that the invention is not restricted to details of the illustrated embodiments, but may be embodied with various changes, modifications or improvements, which may occur to those skilled in the art, without departing from the spirit and scope of the invention.

What is claimed is:

1. A vehicular drive control apparatus comprising:
   an electric differential portion that functions as an electric differential device and which has i) a differential mechanism that distributes output from an engine to a first electric motor and a transmitting member, and ii) a second electric motor that is connected to the transmitting member;

an apparatus having a function of interrupting the transmission of power along a power transmitting path from the transmitting member to a driving wheel;

an apply device that selectively transmits drive torque of the transmitting member to the driving wheel;

a shift operation executing device which is shifted between a non-drive position or non-drive range that places the power transmitting path in a power transmission-interrupted state and a drive position or drive range that places the power transmitting path in a power transmittable state; and a transmitting member rotation speed controlling portion which, when the shift operation executing device is shifted from the non-drive position or non-drive range into the drive position or drive range, controls the rotation speed of the transmitting member such that a predetermined rotation speed difference or predetermined rotation speed ratio is obtained between the rotation speed of the transmitting member before the apply device is applied and the rotation speed of the transmitting member after the apply device has been applied.

2. The control apparatus according to claim 1, wherein the electric differential portion is made to operate as a continuously variable shifting mechanism by the operating states of the first electric motor and the second electric motor being controlled.

3. A vehicular drive control apparatus comprising:

an electric differential portion that functions as an electric differential device and which has i) a differential mechanism that distributes output from an engine to a first electric motor and a transmitting member, and ii) a second electric motor that is connected to the transmitting member, a shifting portion that constitutes a portion of a power transmitting path from the transmitting member to the driving wheel;

an apply device that is provided in the shifting portion and selectively transmits drive torque of the transmitting member to an input rotating member of the shifting portion;

a shift operation executing device which is shifted between a non-drive position or non-drive range that places the power transmitting path in a power transmission-interrupted state and a drive position or drive range that places the power transmitting path in a power transmittable state; and a transmitting member rotation speed controlling portion which, when the shift operation executing device is shifted from the non-drive position or non-drive range into the drive position or drive range, controls the rotation speed of the transmitting member such that a predetermined rotation speed difference or predetermined rotation speed ratio is obtained between the rotation speed of the transmitting member and the rotation speed of the input rotating member of the shifting portion.

4. The control apparatus according to claim 3, wherein the input controlling portion changes a manner to control transmitting torque of the apply device and output torque of the second electric motor between when the predetermined rotation speed difference or predetermined rotation speed ratio is obtained and when the predetermined rotation speed difference or predetermined rotation speed ratio is not obtained.

5. The control apparatus according to claim 4, further comprising:

an input controlling portion that controls transmitting torque of the apply device in a manner such that the transmitting torque of the apply device gradually increases when the predetermined rotation speed difference or the predetermined rotation speed ratio is obtained between the rotation speed of the transmitting member and the rotation speed of the input rotating member of the shifting portion.

6. The control apparatus according to claim 5, wherein the input controlling portion controls output torque of the second electric motor to a constant value while the apply device is executing apply pressure control to apply the transmitting member to the input rotating member.

7. The control apparatus according to claim 5, wherein if the predetermined rotation speed difference or the predetermined rotation speed ratio is not obtained between the rotation speed of the transmitting member and the rotation speed of the input rotating member of the shifting portion, the input controlling portion maximizes the transmitting torque and, after the apply device is completely applied, gradually increases output torque of the second electric motor.

8. The control apparatus according to claim 7, wherein the apply device is determined to be completely applied when a predetermined period of time, which is set in advance, has passed.

9. The control apparatus according to claim 8, wherein the electric differential portion is made to operate as a continuously variable shifting mechanism by the operating states of the first electric motor and the second electric motor being controlled.

10. The control apparatus according to claim 3, wherein the shifting portion is a stepped automatic transmission.

11. A control method of a vehicular drive system that includes an electric differential portion that functions as an electric differential device and which has i) a differential mechanism that distributes output from an engine to a first electric motor and a transmitting member, and ii) a second electric motor that is connected to the transmitting member, an apparatus having a function of interrupting the transmission of power along a power transmitting path from the transmitting member to a driving wheel; an apply device that selectively transmits drive torque of the transmitting member to the driving wheel; and a shift operation executing device which is shifted between a non-drive position that places the power transmitting path in a power transmission-interrupted state and a drive position that places the power transmitting path in a power transmittable state, the control method comprising:

controlling, when the shift operation executing device is shifted from the non-drive position into the drive position, the rotation speed of the transmitting member such that a predetermined rotation speed difference or predetermined rotation speed ratio is obtained between the rotation speed of the transmitting member before the apply device is applied and the rotation speed of the transmitting member after the apply device has been applied.

12. A control method of a vehicular drive system that includes an electric differential portion that functions as an electric differential device and which has i) a differential mechanism that distributes output from an engine to a first electric motor and a transmitting member, and ii) a second electric motor that is connected to the transmitting member; a shifting portion that functions as an automatic transmission and constitutes a portion of a power transmitting path from the transmitting member to the driving wheel; an apply device that is provided in the shifting portion and selectively transmits drive torque of the transmitting member to an input rotating member of the shifting portion; and a shift operation executing device which is shifted between a non-drive position that places the power transmitting path in a power transmission-interrupted state and a drive position that places the power transmitting path in a power transmittable state, the control method comprising:

controlling, when the shift operation executing device is shifted from the non-drive position into the drive position, the rotation speed of the transmitting member such that a predetermined rotation speed difference or predetermined rotation speed ratio is obtained between the rotation speed of the transmitting member and the rotation speed of the input rotating member of the shifting portion.

13. The control method according to claim 12, further comprising:

changing a manner to control transmitting torque of the apply device and output torque of the second electric motor between when the predetermined rotation speed difference or predetermined rotation speed ratio is obtained and when the predetermined rotation speed difference or predetermined rotation speed ratio is not obtained.

14. The control method according to claim 13, further comprising:

controlling transmitting torque of the apply device in a manner such that the transmitting torque of the apply device gradually increases when the predetermined rotation speed difference or the predetermined rotation speed ratio is obtained between the rotation speed of the transmitting member and the rotation speed of the input rotating member of the shifting portion.

15. The control method according to claim 14, wherein output torque of the second electric motor is controlled to a constant value while the apply device is executing apply pressure control to apply the transmitting member to the input rotating member.

16. The control method according to claim 14, wherein when the predetermined rotation speed difference or the predetermined rotation speed ratio is not obtained between the rotation speed of the transmitting member and the rotation speed of the input rotating member of the shifting portion, the transmitting torque of the apply device is maximized and, after the apply device is completely applied, output torque of the second electric motor is gradually increased.

17. The control method according to claim 16, wherein the apply device is determined to be completely applied when a predetermined period of time, which is set in advance, has passed.

* * * * *